(12) United States Patent
Okamoto

(10) Patent No.: US 7,272,140 B2
(45) Date of Patent: Sep. 18, 2007

(54) ADDRESS RETRIEVAL APPARATUS

(75) Inventor: Tsugio Okamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 964 days.

(21) Appl. No.: 10/623,644

(22) Filed: Jul. 22, 2003

(65) Prior Publication Data

US 2004/0136407 A1    Jul. 15, 2004

(30) Foreign Application Priority Data

Jul. 23, 2002 (JP) ............................ 2002-214020

(51) Int. Cl.
*H04L 12/28* (2006.01)
*G06F 15/173* (2006.01)

(52) U.S. Cl. .................. 370/392; 370/401; 709/242

(58) Field of Classification Search ........ 370/252–254, 370/389, 392, 400, 401, 475, 476; 709/238, 709/242
See application file for complete search history.

(56) References Cited

U.S. PATENT DOCUMENTS

| | | | | | |
|---|---|---|---|---|---|
| 5,917,820 | A | * | 6/1999 | Rekhter ...................... | 370/392 |
| 6,011,795 | A | * | 1/2000 | Varghese et al. ............ | 370/392 |
| 6,018,524 | A | * | 1/2000 | Turner et al. ............... | 370/392 |
| 6,061,712 | A | * | 5/2000 | Tzeng ......................... | 709/202 |
| 6,192,051 | B1 | * | 2/2001 | Lipman et al. ............. | 370/389 |
| 6,396,842 | B1 | * | 5/2002 | Rochberger ................. | 370/408 |
| 6,618,760 | B1 | * | 9/2003 | Aramaki et al. ............ | 709/240 |
| 6,658,482 | B1 | * | 12/2003 | Chen et al. ................. | 709/245 |
| 6,665,274 | B1 | * | 12/2003 | Yamada ...................... | 370/256 |
| 6,680,916 | B2 | * | 1/2004 | Puleston .................... | 370/254 |
| 6,778,532 | B1 | * | 8/2004 | Akahane et al. ............ | 370/392 |
| 6,836,771 | B2 | * | 12/2004 | Brown ......................... | 707/3 |
| 6,839,703 | B2 | * | 1/2005 | Jinzaki ........................ | 707/3 |
| 6,888,838 | B1 | * | 5/2005 | Ji et al. ...................... | 370/401 |
| 6,967,959 | B2 | * | 11/2005 | Park ........................... | 370/401 |
| 6,985,483 | B2 | * | 1/2006 | Mehrotra et al. ........... | 370/389 |
| 7,111,071 | B1 | * | 9/2006 | Hooper ....................... | 709/238 |

(Continued)

FOREIGN PATENT DOCUMENTS

JP    11-110041    4/1999

(Continued)

OTHER PUBLICATIONS

Japanese Office Action dated Feb. 6, 2007, with partial English translation.

*Primary Examiner*—Seema S. Rao
*Assistant Examiner*—Hong Sol Cho
(74) *Attorney, Agent, or Firm*—McGinn IP Law Group, PLLC

(57) ABSTRACT

An address retrieval apparatus includes a retrieval table having plural table nodes for different hierarchical levels of a hierarchical tree structure, a divided bit string retrieval block, and a transfer destination distribution information acquiring block for acquiring a transfer destination distribution information from a transfer destination distribution information table based on a retrieval result supplied from the divided bit string retrieval block. An original bit string providing an inputted route information is divided into plural divided bit strings correspondent to respective brunches with the different hierarchical levels, thereby to do retrieval processes by a sequential use of the plural divided bit strings in the sequence from the bottom level to the top level with shifting up by one level the hierarchical level until the location designation information is retrieved.

11 Claims, 25 Drawing Sheets

U.S. PATENT DOCUMENTS

2004/0136407 A1* 7/2004 Okamoto .................... 370/506

FOREIGN PATENT DOCUMENTS

| JP | 11-191781 | 7/1999 |
| JP | 2000-174805 | 6/2000 |
| JP | 2000-188608 | 7/2000 |
| JP | 2000-307641 | 11/2000 |
| JP | 2002-16638 | 1/2002 |

* cited by examiner

| Original | Expanded (3Level₅) | |
|---|---|---|
| $P_5 = 0*$ | $00* (P_5)$ | ↑ |
| $P_1 = 10 *$ | $01* (P_5)$ | Length2 |
| $P_2 = 111*$ | $10* (P_1)$ | |
| $P_3 = 11001*$ | $11* (P_4)$ | ↓ |
| $P_4 = 1*$ | $11100* (P_2)$ | ↑ |
| $P_6 = 1000*$ | $11101* (P_2)$ | |
| $P_7 = 100000*$ | $11110* (P_2)$ | |
| $P_8 = 1000000*$ | $11111* (P_2)$ | Length5 |
| | $11001* (P_3)$ | |
| | $10000* (P_6)$ | |
| | $10001* (P_6)$ | ↓ |
| | $1000001* (P_7)$ | Length7 |
| | $1000000* (P_8)$ | ↓ |

| | |
|---|---|
| "0000" | $P_1$ |
| "0001" | $P_1$ |
| "0010" | $P_1$ |
| "0011" | $P_1$ |
| "0100" | $P_2$ |
| "0101" | $P_2$ |
| "0110" | $P_1$ |
| "0111" | $P_1$ |
| "1000" | $P_4$ |
| "1001" | $P_4$ |
| "1010" | $P_3$ |
| "1011" | $P_4$ |
| "1100" | NULL |
| "1101" | NULL |
| "1110" | NULL |
| "1111" | NULL |

( bit renewal process )

acquiring process for transfer destination distribution information

ADDRESS RETRIEVAL APPARATUS

BACKGROUND OF THE INVENTION

1. Field of the Invention

The present invention relates to an address retrieval apparatus, and more particularly to an address retrieval apparatus for retrieving a transmission destination address, to which one or more packets of data are transmitted through one or more communication networks, so as to assisting a router in distributing the one or more data packets.

All of patents, patent applications, patent publications, scientific articles and the like, which will hereinafter be cited or identified in the present application, will, hereby, be incorporated by references in their entirety in order to describe more fully the state of the art, to which the present invention pertains.

2. Description of the Related Art

A variety of communications have been realized through a variety of communication networks such as the Internet. A router is one of function units for providing interconnections between plural networks. The router retrieves a routing information which indicates or designates the transmission destination address, to which one or more data packets are transmitted. If the networks are included in the Internet, then the one or more packets may be Internet Protocol (IP) packets, so that the router decides an output port for outputting the one or more data packets. Usually, a plurality of the routers are placed over the networks. Each of the routers over the networks sequentially decides and assign the output ports for the packets for defining respective transmission routes over the networks, whereby the respective packets are transmitted through respectively assigned routes over the networks to the respective transmission destination addresses.

This routing operation made by the router is similar to a routing operation that exchanges respectively corresponding to the sequences of figures of telephone number sequentially distribute output ports for the figures of telephone number, so that a call is made upon a complete correspondence in all digits of the telephone number.

For distribution operation by each of the routers over the communication networks, the each router decides or selects one of the plural output ports based on the data included in the each packet with reference to a retrieval table included in the each router, in order to permit the each packet to be transmitted from the selected one of the plural output ports. Namely, the retrieval table enables the router to select one of the plural output ports based on the data included in the each packet.

It is possible that one or more additional terminals are added or one or more existent terminals are removed over the communication networks. It is, hereby, assumed that whereas the router selects a first output port for data packet transmission based on a route information which designates a transmission destination "A" with reference to the existent retrieval table, even any one terminal on a route between the first output port and the transmission destination "A" is removed, whereby the packet outputted from the first output port could no longer reach the transmission destination "A". In this case, it is possible that the router may select a different output port, for example, a third output port for data packet transmission through a different roundabout route between the third output port and the transmission destination "A". In order to respond to any change to the existent configuration of the networks, it is necessary to renew and/or change the existent retrieval table in the each router, or to register new data onto the existent retrieval table with or without deletion of the existent data.

The following descriptions will be made assuming that the data packet is the IP packet. The retrieval table in the router has a distribution information which enables the router to decide or select one of the plural output ports. The distribution information may include any next stage transfer destination, for example, an IP address of an output interface or a next stage router, to which the packet is transmitted. The distribution information may be registered as an IP Sub-Net address and a Prefix length. The term "Sub-Net" means a plurality of subordinate networks divided from the network. The "IP address" may comprise a network address and a host number, so that one or more predetermined significant bits of the host number designates a sub-net number which is used for dividing the network into the plurality of sub-networks. The term "Prefix length" means a length of an effective bit string and is represented by a bit number which corresponds to the length of the effective bit string of address.

The router selects the output port for the packet transmission with reference to the retrieval table, wherein one of the plural IP Sub-Net addresses is decided in accordance with a Longest Prefix Match method, provided that the decided one is longest, in the matched effective bit string which is identical with the IP address as a retrieval key, among the plural IP Sub-Net addresses registered on the retrieval table. It is, for example, assumed that the IP address comprises three bits, and two IP addresses "0**" and "00*" are registered on the retrieval table. The IP address "0**" has a single effective bit "0" as the first bit, while the second and third bits "*" is the arbitrary value which may be either "0" or "1". The IP address "00*" has two effective bits "0" as the first and second bits, while the third bit "*" is the arbitrary value which may be either "0" or "1".

The retrieval with reference to the retrieval table is made by referring the transferred IP address as the retrieval key to the two IP addresses "0**" and "00*" registered on the retrieval table, wherein the transferred IP address indicates the transmission destination, to which the packet is intended to be transmitted. If the transferred IP address is "0001...", then the bit string "00*" is longer in Prefix length than the other bit string "0**". In this case, the Prefix-longest bit string "00*" is selected as the IP address for the next transmission destination.

If the bit number of the IP address is as small as described above, then it is easy to realize a desired high efficiency in retrieving the IP address. Unfortunately, however, the bit number of the actual and practical IP address is much longer than 3. In accordance with the Internet Protocol version 4 (IPv4), the bit number of the IP address is 32. In accordance with the recently standardized Internet Protocol version 6 (IPv6), the bit number of the IP address is 128. In such cases, it is no longer easy to realize the desired high efficiency in retrieving the IP address. Namely, it is practically difficult for the router to realize the desired high efficiency in obtaining the transmission destination information based on the data included in the each packet with reference to a retrieval table included in the each router.

There are two existent retrieval methods, for example, a Binary Tree retrieval method, and a Prefix Expansion retrieval method. The Binary Tree retrieval method utilizes a two-branched data configuration. FIG. 1 is a view illustrative of respective bit patterns of eight IP addresses P1, P2, P3, P4, P5, P6, P7 and P8. "*" represents the arbitrary value which may be either "0" or "1". FIG. 2 is a diagram illustrative of the two-branched data configuration utilized by the Binary Tree retrieval method, wherein the eight IP addresses P1, P2, P3, P4, P5, P6, P7 and P8 constitute the two-branched tree-structure from a starting point 101. In accordance with the Binary Tree retrieval method, sequential bit referring operations from the head bit in one-bit unit or one-bit-by-one-bit are made. The two-branched tree-structure comprises a plurality of nodes including the eight IP addresses P1, P2, P3, P4, P5, P6, P7 and P8, a plurality of first type segments extending left-downwardly which correspond to "0"-bit, and a plurality of second type segments extending right-downwardly which correspond to "1"-bit, wherein each of the first and second type segments interconnects adjacent two of the plurality of nodes.

Japanese laid-open patent publication No. 11-191781 discloses an address retrieval apparatus including a hardware circuit which makes the retrieval of the address by utilizing the binary-tree structure as the routing table, wherein unnecessary branches are removed for performing a desired high speed route-retrieval operation. The use of the hardware circuit for the retrieval allows the desired high speed route-retrieval operation.

In accordance with the above retrieval method utilizing the binary-tree structure, there is any tree structure which has the same number of brunches as the maximum address bit number. In accordance with the Internet Protocol version 4, the IP address comprises 32-bits. The above example shown in FIGS. 1 and 2 is the case of 8-bits configuration. 32-bits tree-structure may have 32 brunches at the maximum. This means it necessary to make 32-times of access to the nodes. The Binary-Tree retrieval method is advantageous in view of allowing the increase in the times of access to the nodes and resulting in an undesired low efficiency of the retrieval operation. The use of the hardware for realizing the retrieval instead of any software is insufficient for compensating for the increased number of bunches of the binary-tree structure.

In order to reduce the number of bunches in the binary-tree structure, the Prefix Expansion retrieval method is effective. Japanese laid-open patent publication No. 2000-307641 discloses that the Prefix Expansion retrieval method, wherein the bit string of the IP address is divided into a plurality of divided subordinate bit strings. FIG. 3 is a diagram illustrative of a hierarchical structure of plural subordinate bit strings divided from the bit string of the IP address. The divided subordinate bit strings are configured in a hierarchical structure. First to fourth retrieval tables 111, 112, 113 and 114 are provided for the divided subordinate bit strings, respectively. In each of the first to fourth retrieval tables 111, 112, 113 and 114, the divided subordinate bit string serves as an entry address.

In the example shown in FIG. 3, there are triple-layered hierarchical structure, wherein a string of 7-bits in total of the IP address is divided into two bits for the lowest level in the triple-layered hierarchical structure, three bits for the middle level, and two bits for the highest level. The first retrieval table 111 is positioned at the highest level in the triple-layered hierarchical structure. The second and third retrieval tables 112 and 113 are positioned at the middle level in the triple-layered hierarchical structure. The fourth retrieval table 114 is positioned at the lowest level in the triple-layered hierarchical structure.

In each of the first and fourth retrieval tables 111 and 114 at the highest and lowest levels respectively, four divided subordinate bit strings "00", "01", "10" and "11" are the entry address. In each of the second and third retrieval tables 112 and 113 at the middle level, eight divided subordinate bit strings "000", "001", "010", "011", "100", "101", "110", and "111" are the entry address.

In accordance with this Prefix Expansion retrieval method, for renewal of an IP address registered on a retrieval table, an end/continue flag which indicates whether a transmission of this IP address is ended at this retrieval table or continued to a next retrieval table, a next table pointer which indicates a next IP address for a next transfer destination are stored or registered with overlap respectively into all of the entries allowing the registrations in the entries of this retrieval table.

For registering the IP address on the each retrieval table, a bit string of an entry, which does not reach a terminal of each divided subordinate bit string, is expanded up to the terminal of each divided subordinate bit string. It is, for example, assumed that the divided subordinate bit string at one level in the hierarchical structure comprises 3-bits, while a bit string of the entry is smaller bit number, 2 bits or 1-bit. In this case, the shorter bit string is expanded to the 3-bits length. Respective short bit strings are expanded to a uniform or common bit length, so that a plurality of the bit-length-expanded entries including the short bit strings do correspond to the common registered IP address.

FIG. 4 is a view illustrative of both original IP addresses different in bit length from each and shown in FIG. 1, and expanded IP addresses up to three different bit lengths. Registered IP addresses of the eight IP addresses P1, P2, P3, P4, P5, P6, P7 and P8 are respectively expanded up to least significant bits of the respective divided subordinate bit strings. The IP address P5 has a prefix length of "1" as an effective bit string length. The IP address P5 has the original and pre-expansion bit string "0*". The IP address P5 is expanded by one bit to 2-bits length, and has two expanded bit strings "00" and "01". With reference back to FIG. 3, the IP address P5 is registered with overlap at both the entry addresses "00" and "01" on the first retrieval table 111 at the highest level.

The IP address P2 has a prefix length of "3" as an effective bit string length. The IP address P2 has the original and pre-expansion bit string "111*". The IP address P2 is expanded by two bits to 5-bits length, and has four expanded bit strings "11100", "11101", "11110", and "11111". On the second and third retrieval tables 112 and 113, strings of the third to fifth significant bits correspond to the entry addresses. With reference again to FIG. 3, the IP address P2 is registered with overlap at the four entry addresses "100", "101", "110", and "111" on the third retrieval table 113 at the middle level.

As described above, the bit-strings expansions of the IP addresses make the registered IP addresses correspond to specific entry addresses on the retrieval tables. This allows that the divided subordinate bit strings of the registered IP addresses are simply or directly compared to the entry addresses of the retrieval tables for the retrieval process.

Namely, the prefix expanded retrieval method limits the maximum retrieval times to the number of the multilevels of the hierarchical structure. The prefix expanded retrieval method is effective to reduce the maximum retrieval times. In the above-example shown in FIG. 3, the four retrieval tables are configured in the three-level hierarchical structure. Thus, the maximum retrieval times are only three.

Each of the first to fourth retrieval tables 111, 112, 113 and 114 further include the above-described end/continue flag, a transfer destination distribution information, a pointer effective/ineffective flag which indicates whether a pointer of the transfer destination distribution information is effective or ineffective, and a pointer to a retrieval table including a next-retrieved bit string. Those entry informations are stored or registered in all of the entries which allow the registrations thereof. For the original and pre-expansion bit string "0*", the entry information is stored and registered in both the 1-bit-expanded strings "00" and "01".

For registering the IP address on the each retrieval table, a bit string of an entry, which does not reach a terminal of each divided subordinate bit string, is expanded up to the terminal of each divided subordinate bit string. After the bit string has been expanded, the entry information corresponding to the original and pre-expansion bit string is entirely stored and registered on all of the retrieval tables which include the divided subordinate bit strings divided from the original and pre-expansion bit string. The write operation raises the following problems.

Figure 5:
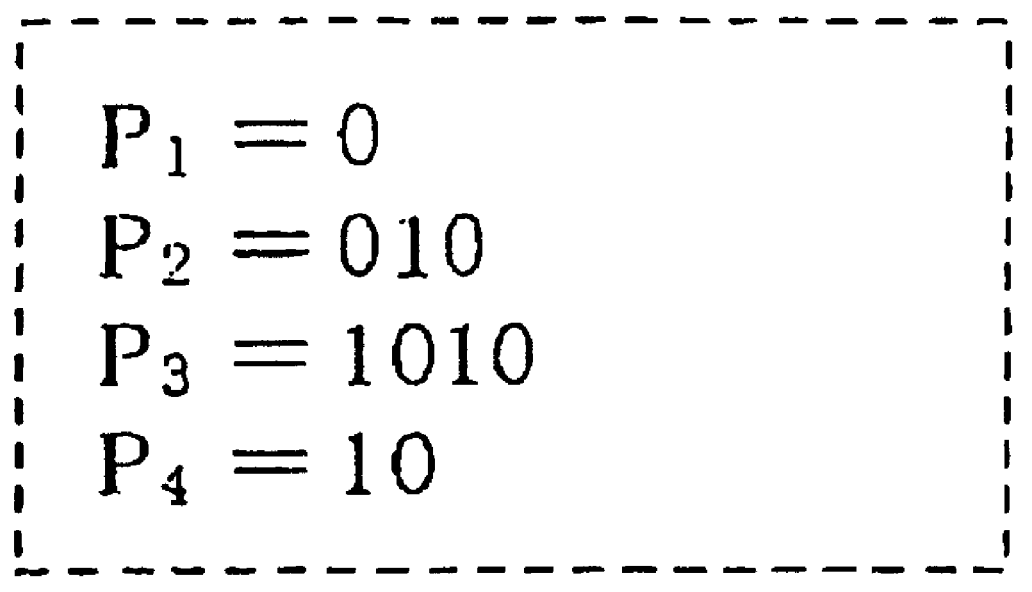

FIG. 5 is a view illustrative of four bit patterns of IP addresses P1, P2, P3 and P4. FIG. 6 is a view illustrative of correspondences between the expanded four-bits strings and the expanded IP addresses. With reference to FIGS. 5 and 6, an example will be described to clarify the problems in connection with the above-described prefix expanded retrieval method. It is, hereby, assumed that an original and pre-expansion bit string is longer than another original and pre-expansion bit string. The first original IP address P1 is "0" and has a single-bit length. The first original IP address P1 is expanded to 4-bits strings "0***", for example, eighth 4-bits strings "0000", "0001", "0010", "0011", "0100", "0101", "0110", and "0111".

The second original IP address P2 is "010" and has a 3-bit length. The second original IP address P2 is expanded to 4-bits strings "010*", for example, two 4-bits strings "0100" and "0101".

The third original IP address P3 is "1010" and has a 4-bit length. The third original IP address P3 is not expanded.

The fourth original IP address P4 is "10" and has a 2-bit length. The fourth original IP address P4 is expanded to 4-bits strings "10**", for example, four 4-bits strings "1000", "1001", "1010" and "1011".

With reference to FIG. 6, there are theoretically sixteen different 4-bits strings which include four 4-bits strings "11", for example, "1100", "1101", "1110" and "1111" which are not derived from the four original IP addresses P1, P2, P3 and P4 shown in FIG. 5. The router is configured to respond to the expanded 4-bits strings "00", "01", and "10", but is not responsible to four 4-bits strings "11". For this reason, those four 4-bits strings "11" are not registered (NULL) as the IP addresses, while twelve expanded 4-bits strings "00", "01", and "10**" are registered with correspondence to the four original IP addresses P1, P2, P3 and P4. For example, the bit string "0000" is registered as the first IP address P1.

It should be noted that two or more expanded IP addresses correspond to a common expanded 4-bits string, wherein the two or more expanded IP addresses conflict to each other with reference to the common expanded 4-bits string. This raises an issue of whether either one of the conflicting two or more IP addresses should be made correspond to the common expanded 4-bits string.

For example, the expanded 4-bits string "0100" is derived from the original and pre-expansion bit string "0" and corresponds to the first original IP address P1, as well as is derived from the original and pre-expansion bit string "010" and corresponds to the second original IP address P2. Namely, the first and second original IP addresses P1 and P2 conflict to each other with reference to the expanded 4-bits string "0100". This raises an issue of whish either one of the conflicting first and second IP addresses P1 and P2 should be made correspond to the common expanded 4-bits string "0100".

Similarly, the expanded 4-bits string "0101" is also derived from the original and pre-expansion bit string "0" and corresponds to the first original IP address P1, as well as is derived from the original and pre-expansion bit string "010" and corresponds to the second original IP address P2. Namely, the first and second original IP addresses P1 and P2 conflict to each other with reference to the expanded 4-bits string "0101". This raises a further issue of whish either one of the conflicting first and second IP addresses P1 and P2 should be made correspond to the common expanded 4-bits string "0101".

If two or more expanded IP addresses conflict to each other with reference to the common expanded 4-bits string, then one expanded IP address, which has a longer or longest original and pre-expansion bit string, is given a priority to correspond to the common expanded 4-bits string. Namely, an entry information corresponding to the longer original and pre-expansion bit string is registered or stored. In the above-described two examples, the original and pre-expansion bit string "010" of the second IP address P2 is longer than the original and pre-expansion bit string "0" of the first IP address P1. As shown in FIG. 6, the second IP address P2 is given the priority to correspond to the common expanded 4-bits string "0100".

For example, the expanded 4-bits string "1010" is derived from the original and pre-expansion bit string "1010" and corresponds to the third original IP address P3, as well as is derived from the original and pre-expansion bit string "10" and corresponds to the fourth original IP address P4. Namely, the third and fourth original IP addresses P3 and P4 conflict to each other with reference to the expanded 4-bits string "1010". This raises another issue of whish either one of the conflicting third and fourth original IP addresses P3 and P4 should be made correspond to the common expanded 4-bits string "1010". The original and pre-expansion bit string "1010" of the third IP address P3 is longer than the original and pre-expansion bit string "10" of the fourth IP address P4. As shown in FIG. 6, the third IP address P3 is given the priority to correspond to the common expanded 4-bits string "1010".

FIG. 7 is a diagram illustrative of one of the conventional retrieval tables. The transfer destination distribution information is referred to as "NHP". In accordance with the conventional prefix expanded retrieval method, expanded bit strings "000", "001", "010", "011", "100", "101", "110", "111", are made corresponding to transfer destination distribution informations "NHP1", "NHP2", "NHP3", "NHP4", "NHP5", "NHP6", "NHP7" and "NHP8". Further, the expanded bit strings "000", "001", "010", "011", "100", "101", "110", "111", are made corresponding to next or higher hierarchical level node pointers "LPTR1", "LPTR2", "LPTR3", "LPTR4", "LPTR5", "LPTR6", "LPTR7" and "LPTR8".

FIG. 8 is a block diagram illustrative of a configuration of a conventional address retrieval apparatus for managing divided bit strings. A conventional address retrieval apparatus 120 includes a retrieval table 121, a bit string management table 122, and an IP address management process block 123 which is functionally coupled to both the retrieval table 121, and the bit string management table 122. The bit string management table 122 is essential for the conventional address retrieval apparatus 120.

FIG. 9 is a flow chart illustrative of sequential steps of a bit renewal process involved in registration, deletion and renewal processes for bit strings on the retrieval table in the conventional address retrieval apparatus shown in FIG. 8. In the step S201, registration, deletion or renewal is made of a subject bit string on the bit string management table 122. In the step S202, an original and pre-expansion bit string is obtained from the bit string management table 122. In the step S203, the original and pre-expansion bit string is expanded to a longer bit string of a predetermined bit number. In the step S204, a calculation is made of the bit string to be stored into the retrieval table 121. During the calculation, if the same bit strings are present, then one of the bit strings is selected, wherein the selected one is derived from the original and pre-expansion bit string which is longer than the original and pre-expansion bit string which was expanded to the unselected one. In the step S205, the calculated bit strings are stored on the retrieval table 121. The renewal process is then completed.

The conventional address retrieval apparatus 120 needs not only the retrieval table 121 but also the bit string management table 122. For taking place at least one of the registration, deletion and renewal processes, it is necessary to expand the divided bit string to the predetermined bit number.

In accordance with the prefix expanded retrieval method, as described above, an entry information storing regulation is necessary, for which reason it is impossible to leave pre-expansion informations on the retrieval table, where the pre-expansion information indicates a configuration of the original and pre-expansion bit string. For this reason, the original and pre-expansion bit string configuration information is necessary for taking place at least one of the registration, deletion and renewal processes. In order to hold the original and pre-expansion bit string configuration information, an additional table for managing he retrieval table is further needed.

With reference again to FIG. 5, descriptions will be made, assuming that the IP address P2 is deleted. In this example, two bit strings "0100" and "0101" are deleted. The retrieval table does not include any effective information of what should be stored at positions of the two bit strings "0100" and "0101". For example, two different-length bit configurations "A" and "B" are present, wherein the bit configuration "A" is longer than the bit configuration "B". The longer bit configuration "A" is registered on the retrieval table. Any change is caused of the communication network, whereby a router becomes not needing the longer bit configuration "A". Thus, the bit configuration "A" and its accompanying transfer destination distribution information should be deleted from the retrieval table. Notwithstanding, the retrieval table does not include any effective or useful information which indicates which bit configuration would conflict with the bit configuration "A", namely, the retrieval table does not include any effective or useful information which indicates which bit string should be registered instead of deletion of the bit configuration "A".

For the prefix expanded retrieval method, it is necessary to store, on the retrieval table, the same number of the transfer destination distribution informations as the registered bit strings. Further, it is necessary that each hierarchical level or layer for retrieval of the divided bit strings holds those transfer destination distribution informations. The conventional address retrieval apparatus performing the prefix expanded retrieval method needs a relatively large memory size for managing the retrieval table.

In the above circumstances, the development of a novel address retrieval apparatus free from the above problems is desirable.

SUMMARY OF THE INVENTION

Accordingly, it is an object of the present invention to provide a novel address retrieval apparatus free from the above problems.

It is a further object of the present invention to provide a novel address retrieval apparatus allowing easy processes for addition and deletion of addresses to and from a retrieval table needed for routing communication networks.

It is a still further object of the present invention to provide a novel address retrieval apparatus allowing reduction in memory size necessary for managing a retrieval table needed for routing communication networks.

The present invention provides an address retrieval apparatus including: a divided bit string generating unit for dividing an original bit string into a plurality of divided bit strings, each of which has one of plural different hierarchical levels, the original bit string providing a route information which defines a route to a final destination for data transmission through a communication network; a transfer destination distribution information storage unit for storing a transfer destination distribution information which indicates a distributed transfer destination for data transmission in accordance with the route information; a retrieval table including a hierarchical tree structure which comprises the divided bit strings and plural retrieval table nodes, wherein each of the plural retrieval table nodes further includes at least one of a next retrieval table node designation information indicating a next retrieval table node based on corresponding one of the divided bit strings and a transfer destination distribution information storage location designation information designating a location at which the transfer destination distribution information is stored in the transfer destination distribution information storage unit; a hierarchy definition unit for shifting up by one level a hierarchy level of the retrieval table node to execute a retrieval process with reference to the retrieval table node until the hierarchy definition unit retrieves the transfer destination distribution information storage location designation information from the retrieval table node, and the hierarchy definition unit defining one hierarchy level upon retrieval of the transfer destination distribution information storage location designation information; and a transfer destination distribution information acquiring unit for acquiring the transfer destination distribution information from the retrieval table node based on the transfer destination distribution information storage location designation information retrieved by the hierarchy definition unit from the retrieval table node with the defined hierarchy level.

The above and other objects, features and advantages of the present invention will be apparent from the following descriptions.

BRIEF DESCRIPTION OF THE DRAWINGS

Preferred embodiments according to the present invention will be described in detail with reference to the accompanying drawings.

FIG. 1 is a view illustrative of respective bit patterns of eight IP addresses.

FIG. 4 is a view illustrative of both original IP addresses different in bit length from each and shown in FIG. 1, and expanded IP addresses up to three different bit lengths.

FIG. 5 is a view illustrative of four bit patterns of IP addresses.

FIG. 6 is a view illustrative of correspondences between the expanded four-bits strings and the expanded IP addresses.

FIG. 20 is a view illustrative of an IP address registered on the retrieval table included in the address retrieval apparatus shown in FIG. 10.

DETAILED DESCRIPTION OF THE INVENTION

Figure 2:
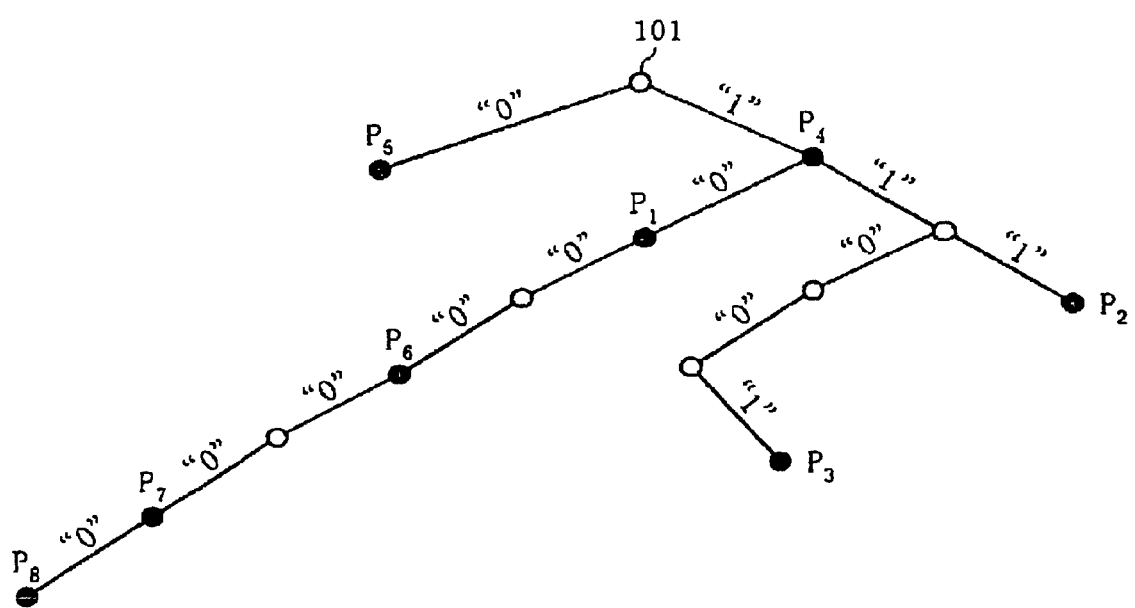
FIG. 2 is a diagram illustrative of the two-branched data configuration utilized by the Binary Tree retrieval method.
Figure 3:
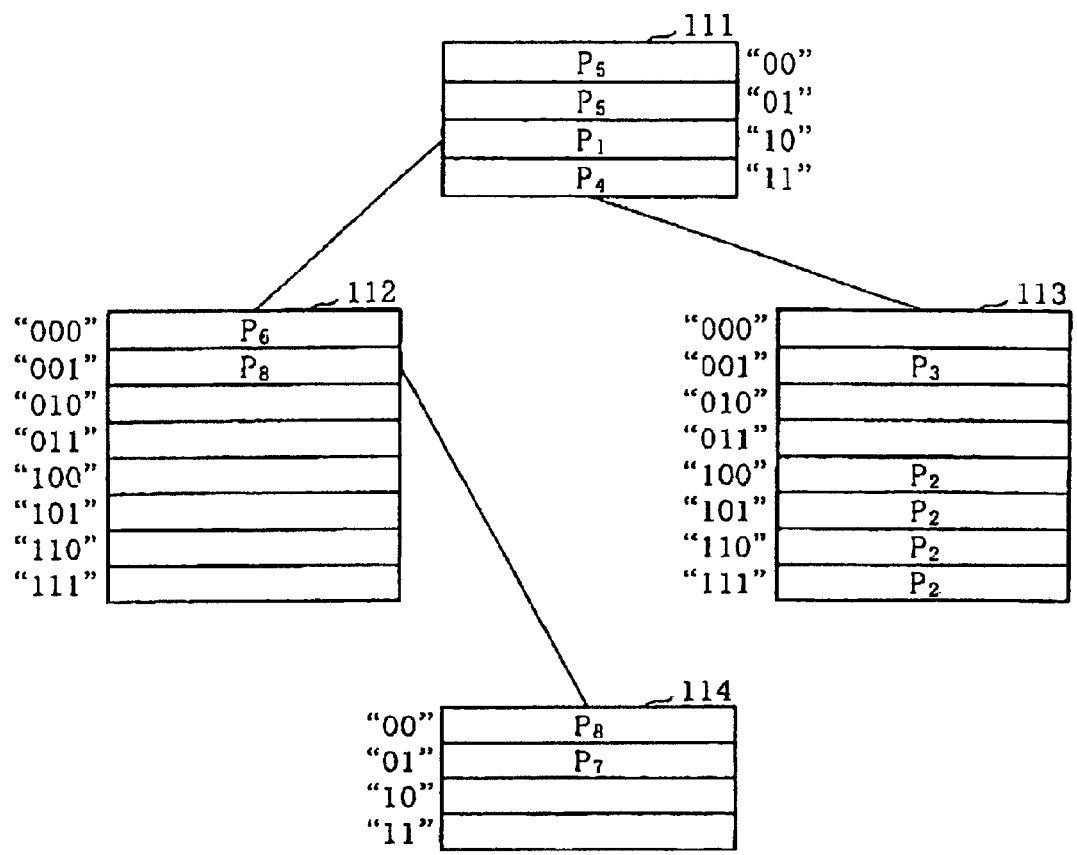
FIG. 3 is a diagram illustrative of a hierarchical structure of plural subordinate bit strings divided from the bit string of the IP address.
Figure 7:
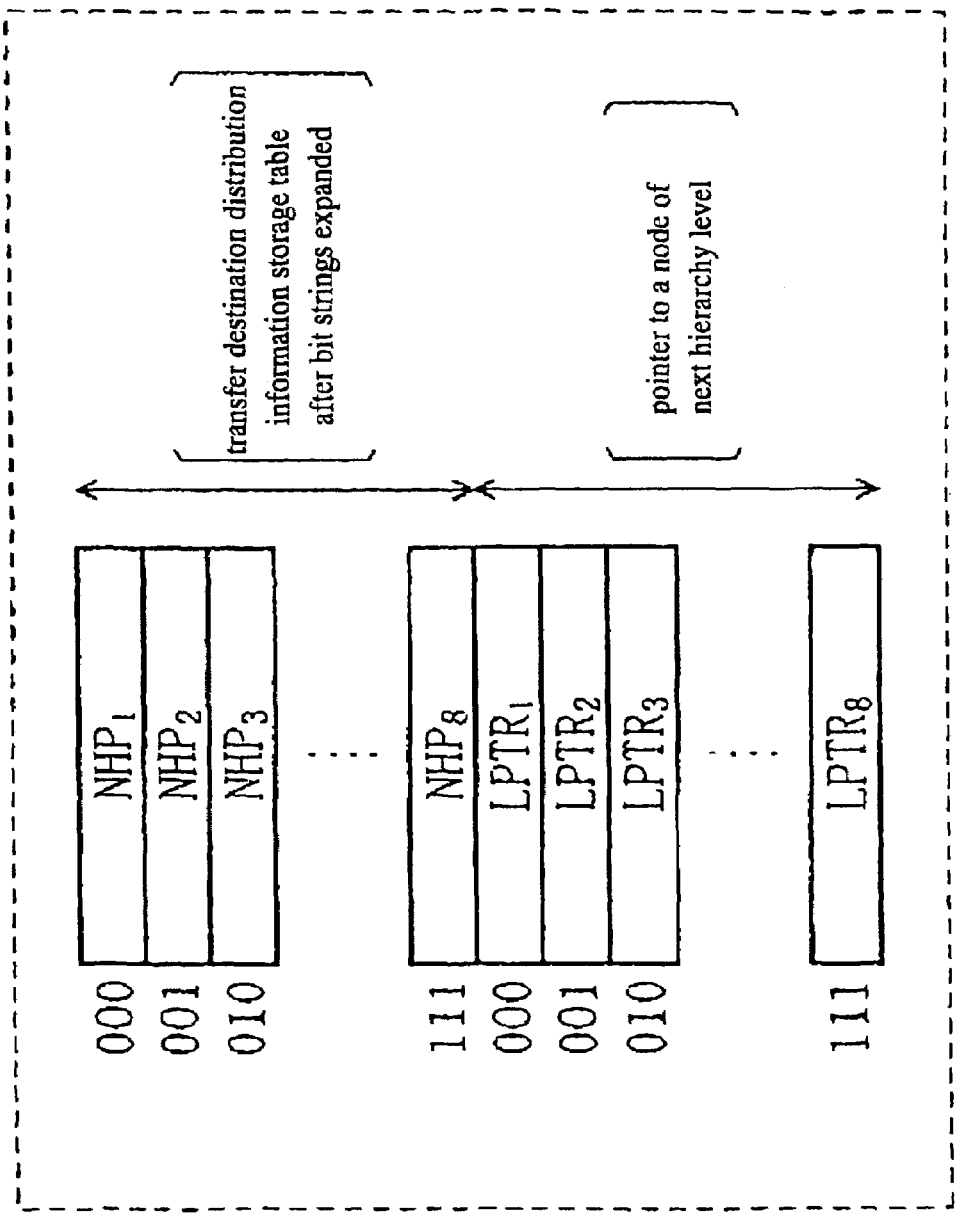
FIG. 7 is a diagram illustrative of one of the conventional retrieval tables.

A first aspect of the present invention is an address retrieval apparatus including the following constitutional elements. A divided bit string generating unit divides an original bit string into a plurality of divided bit strings. Each of the plural divided bit strings has one of plural different hierarchical levels. The original bit string provides a route information which defines a route to a final destination for data transmission through a communication network. A transfer destination distribution information storage unit stores a transfer destination distribution information which indicates a distributed transfer destination for data transmission in accordance with the route information. A retrieval table includes a hierarchical tree structure which comprises the divided bit strings and plural retrieval table nodes. Each of the plural retrieval table nodes further includes at least one of a next retrieval table node designation information, which indicates a next retrieval table node based on corresponding one of the divided bit strings, and a transfer destination distribution information storage location designation information, which designates a location, at which the transfer destination distribution information is stored in the transfer destination distribution information storage unit. A hierarchy definition unit shifts up by one level a hierarchy level of the retrieval table node, so as to execute a retrieval process with reference to the retrieval table node until the hierarchy definition unit retrieves the transfer destination distribution information storage location designation information from the retrieval table node, so that the hierarchy definition unit defines one hierarchy level upon retrieval of the transfer destination distribution information storage location designation information. A transfer destination distribution information acquiring unit acquires the transfer destination distribution information from the retrieval table node based on the transfer destination distribution information storage location designation information retrieved by the hierarchy definition unit from the retrieval table node with the defined hierarchy level.

In accordance with the present invention, the divided bit string generating unit divides the original bit string from a head to a tail of the original bit string in accordance with a predetermined bit length rule for each of the plural different hierarchical levels. The divided bit string generating unit further fetches the divided bit strings in a sequence from the head to the tail of the original bit string, so that the divided bit strings in the sequence from the head to the tail respectively correspond to the plural different hierarchical levels in a sequence of a bottom level to a top level. Namely, the divided bit string derived from the head of the original bit string corresponds to the bottom level of the plural different hierarchical levels. The divided bit string derived from the tail of the original bit string corresponds to the top level of the plural different hierarchical levels.

The hierarchical tree structure of the retrieval table comprises the divided bit strings positioned at branches of the tree and plural retrieval table nodes positioned at nodes of the tree. Each of the plural retrieval table nodes further includes the next retrieval table node designation information, which indicates a next retrieval table node based on corresponding one of the divided bit strings, or the transfer destination distribution information storage location designation information, which designates a location, at which the transfer destination distribution information is stored in the transfer destination distribution information storage unit. During reading out the next retrieval table node designation information from a retrieval table node with a first hierarchical level, the hierarchy definition unit shifts up by one level the hierarchy level of the retrieval table node, so as to execute the retrieval process with reference to the retrieval table node in the sequence of the bottom level to the top level of the plural different hierarchical levels by use of the divided bit strings in the sequence from the head to the tail. The execution of the retrieval process with shifting up the hierarchy level is continued until the hierarchy definition unit retrieves the transfer destination distribution information storage location designation information from the retrieval table node, so that the hierarchy definition unit defines one hierarchy level upon retrieval of the transfer destination distribution information storage location designation information.

The transfer destination distribution information acquiring unit acquires the transfer destination distribution information from the retrieval table node based on the transfer destination distribution information storage location designation information retrieved by the hierarchy definition unit from the retrieval table node with the defined hierarchy level, thereby to determine a destination for data transmission.

The original bit string providing the inputted route information, for example, an IP address, is divided into the plural divided bit strings. The plural divided bit strings are then made correspondent to respective brunches with different hierarchical levels of the hierarchical tree structure, so as to do the retrieval process by a sequential use of the plural divided bit strings in the sequence from the bottom level to the top level with shifting up by one level the hierarchical level until the hierarchy definition unit retrieves the transfer destination distribution information storage location designation information from the retrieval table node, so that the hierarchy definition unit defines one hierarchy level upon retrieval of the transfer destination distribution information storage location designation information, while the above shifting up operation is discontinued. The transfer destination distribution information acquiring unit acquires the transfer destination distribution information from the retrieval table node based on the transfer destination distribution information storage location designation information. Namely, only a single storage unit is needed for storing the transfer destination distribution information which defines the route to the destination for the data transmission, so that the transfer destination distribution information is read out of the single storage unit and used for distributing the transfer destination for the data transmission.

Further, the retrieval table nodes are arranged at node of the hierarchical tree structure of the retrieval table. The maximum number of the necessary retrieval processes to the retrieval table nodes is the number of the different hierarchical levels, and is smaller than a total number of the divided bit strings divided from the original bit strong providing the route information. This means that the above apparatus reduces the necessary number of the retrieval processes and the necessary time for completing the retrieval processes.

Furthermore, the transfer destination distribution information is stored in the transfer destination distribution information storage unit which is functionally separated or different from the retrieval table, thereby allowing an effective use of the memory area and also making it easy to renewal or change, deletion and addition to the retrieval table.

It is possible that only the retrieval table node necessary for storing the next retrieval table node designation information includes a storage area for storing the next retrieval table node designation information, and the retrieval table node unnecessary storing the next retrieval table node designation information is free of the storage area. For example, the retrieval table node at the top hierarchical level does not need to store the next retrieval table node designation information, for which reason the retrieval table node at the top hierarchical level may be free of the storage area for storing the next retrieval table node designation information. This allows the effective usage of the memory area.

It is also possible that each of the retrieval table nodes at all of the hierarchical levels includes an additional information which indicates a presence or an absence of the retrieval table node having a next hierarchical level which is higher by one level than its hierarchical level of the each retrieval table node. If the additional information indicates the absence of the retrieval table node having the next hierarchical level which is higher by one level than its hierarchical level of the each retrieval table node, then this means that the retrieval table node including this additional information is positioned at the top level.

It is also possible that the transfer destination distribution information storage location designation information includes an area storing the transfer destination distribution information in the transfer destination distribution information storage unit, and an address which designates a storage location of the transfer destination distribution information in this area. This area and the address included in the transfer destination distribution information storage location designation information are used to acquire the transfer destination distribution information from the transfer destination distribution information storage unit. The hierarchy definition unit shifts up by one level the hierarchy level of the retrieval table node, so as to execute the retrieval process with reference to the retrieval table node in the sequence of the bottom level to the top level of the plural different hierarchical levels by use of the divided bit strings in the sequence from the head to the tail. This execution of the retrieval process with shifting up the hierarchy level is continued until the hierarchy definition unit retrieves the transfer destination distribution information storage location designation information from the retrieval table node, so that the hierarchy definition unit defines one hierarchy level upon retrieval of the transfer destination distribution information storage location designation information. If the retrieval table node with the defined hierarchy level designates one of plural areas which store the transfer destination distribution informations in the transfer destination distribution information storage unit, then the address corresponding to the route information in this designated one area is also read out of the retrieval table node with the defined hierarchy level, thereby determining the location, at which the target transfer destination distribution information is stored.

It is also possible that the number of addresses possessed by the area, at which the transfer destination distribution information is stored, is equal to the square of a bit number of corresponding one of the divided bit strings. If the bit number of the divided bit string is large, then the area for storing the transfer destination distribution information is also large.

It is also possible as one typical example that the divided bit strings have a uniform bit number over the different hierarchical levels in order to simplify the dividing process and unifying memory area sizes for storing the transfer destination distribution information. Notwithstanding, it is also possible as another example that the bit number of the divided bit string varies over the different hierarchical levels.

It is also possible that the divided bit string generating unit further comprises a plurality of divided bit string generating sub-units which correspond to the plural different hierarchical levels. The hierarchy definition unit further comprises a plurality of hierarchy definition sub-units which correspond to the plural different hierarchical levels. The retrieval table further comprises a plurality of retrieval sub-tables which correspond to the plural different hierarchical levels. The divided bit string generating sub-units, the hierarchy definition sub-units and the retrieval sub-tables make plural sets which correspond to the plural different hierarchical levels, so that the plural sets perform parallel processings for the plural different hierarchical levels. Parallel retrieval processes at the plural different hierarchical levels realize high speed retrieval processes.

It is also possible that the transfer destination distribution information acquiring unit includes an off-set pointer calculation unit for calculating an off-set point, which designates a storage location of a bit string in one of nodes of the transfer destination distribution information storage unit, based on a retrieval result supplied from the hierarchy definition unit.

The following embodiments are typical examples for practicing the foregoing aspects of the present invention. Although the subject matters of the present invention have been described in details, the following additional descriptions in one or more typical preferred embodiments or examples will be made with reference to the drawings for making it easy to understand the typical modes for practicing the foregoing aspects of the present invention.

DETAILED DESCRIPTION OF THE PREFERRED EMBODIMENTS

First Embodiment

Figure 10:
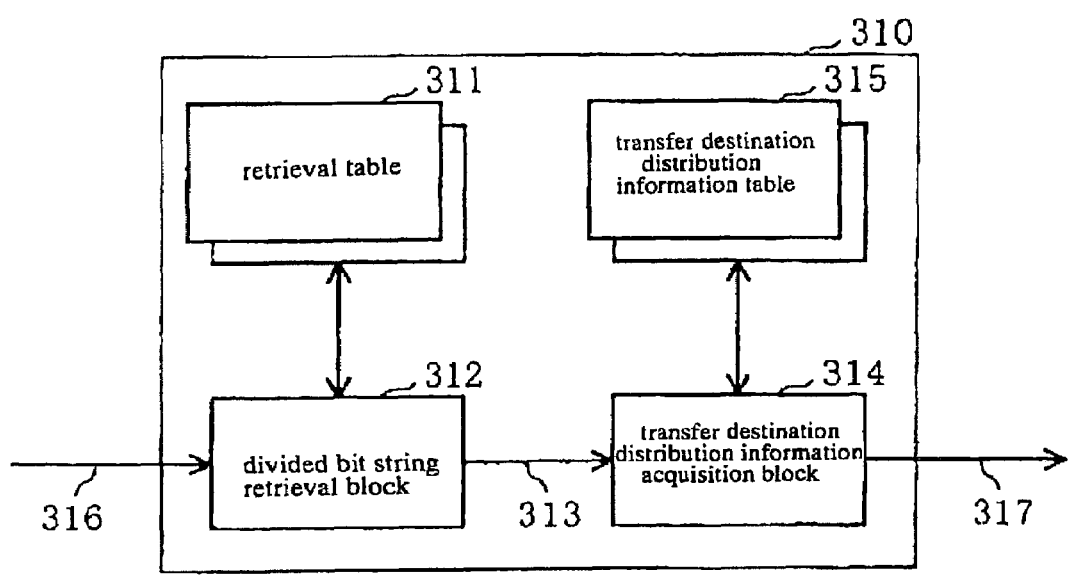
FIG. 10 is a block diagram illustrative of a configuration of a novel address retrieval apparatus in a first embodiment in accordance with the present invention.

A first embodiment according to the present invention will be described in detail with reference to the drawings. FIG. 10 is a block diagram illustrative of a configuration of a novel address retrieval apparatus in a first embodiment in accordance with the present invention. An address retrieval apparatus 310 includes a retrieval table 311, a divided bit string retrieval block 312, a transfer destination distribution information acquisition block 314, and a transfer destination distribution information table 315. The retrieval table 311 stores divided bit strings with different hierarchical levels. The divided bit string retrieval block 312 receives an IP address 316 and retrieves each hierarchical level of the divided bit strings with reference to the retrieval table 311 to generate a retrieval result information 313. The transfer destination distribution information acquisition block 314 receives the retrieval result information 313 from the divided bit string retrieval block 312 and acquires a transfer destination distribution information 317 with reference to the transfer destination distribution information table 315 based on the received retrieval result information 313, so as to output the acquired transfer destination distribution information 317. The retrieval result information 313 includes a bit string EBIT, a pointer NN-PTR, STAGE and an input IP address which will be described in detail later.

Figure 8:
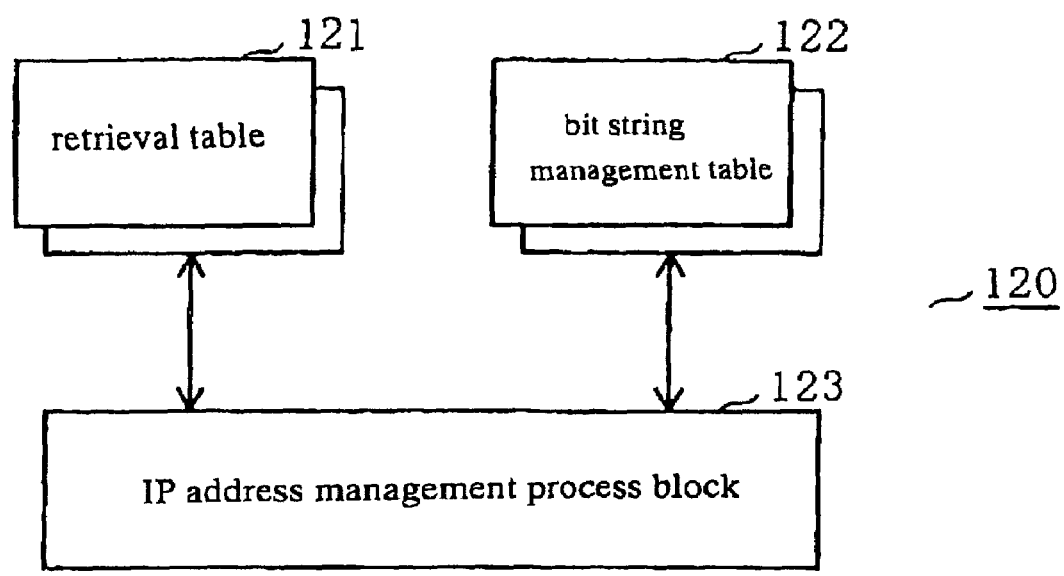
FIG. 8 is a block diagram illustrative of a configuration of a conventional address retrieval apparatus for managing divided bit strings.

The novel address retrieval apparatus 310 shown in FIG. 10 is different in configuration from the conventional address retrieval apparatus 120 shown in FIG. 8. The novel address retrieval apparatus 310 has the retrieval table 311 and the transfer destination distribution information table 315 shown in FIG. 10, instead of the retrieval table 121 of the conventional address retrieval apparatus 120 shown in FIG. 8. Retrievals to all hierarchical levels of the divided bit strings are made by access to the retrieval table 311 before the transfer destination distribution information 317 is acquired by access to the transfer destination distribution information table 315. This novel configuration shown in FIG. 10 allows a considerable reduction in memory size necessary for managing the retrieval table needed for routing communication networks as compared to the conventional configuration shown in FIG. 8.

Figure 11:
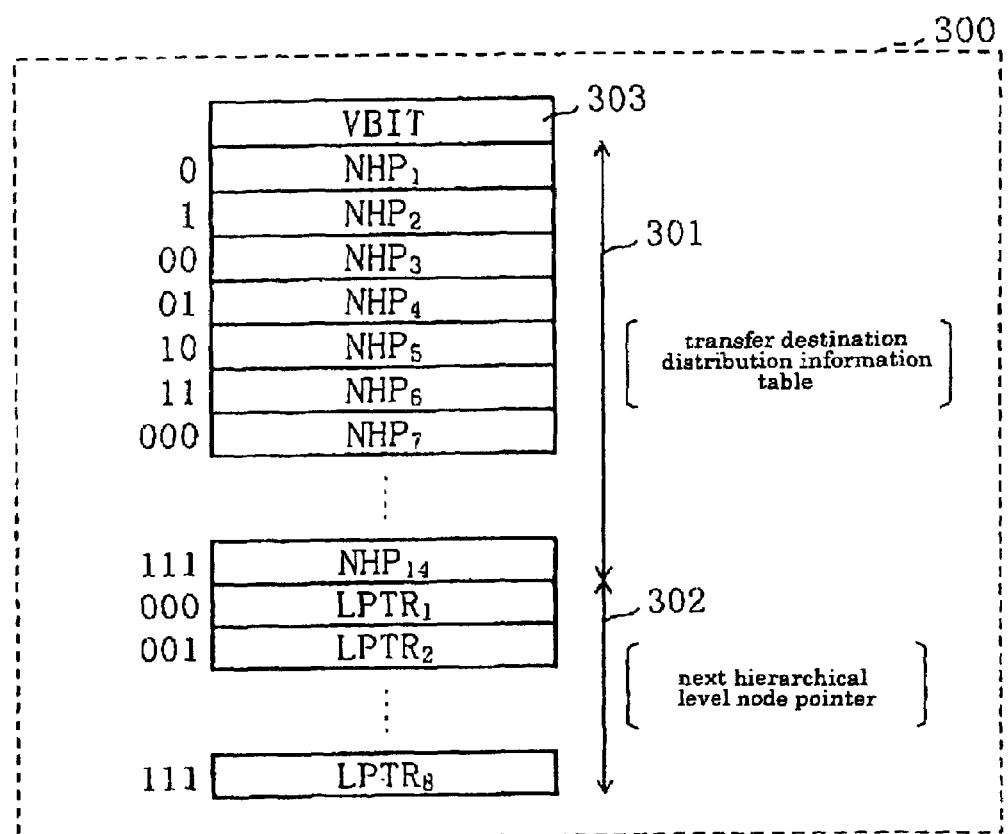
FIG. 11 is a diagram illustrative of an essential part of a retrieval table of a hierarchical structure to be used for a novel address retrieval apparatus in accordance with the present invention.

FIG. 11 is a diagram illustrative of an essential part of a retrieval table of a hierarchical structure to be used for a novel address retrieval apparatus in accordance with the present invention. The retrieval table 300 includes a transfer destination distribution information table 301 and a next or higher hierarchical level node pointer 302. The transfer destination distribution information table 301 provides a field for storing unexpanded bit strings. An example illustrated in FIG. 11 is that the divided bit string comprises 3-bits. The retrieval table 300 includes a VBIT field 303 for storing a bit information which indicates whether an entry of the transfer destination distribution information table 301 is enabled or null. The transfer destination distribution information table 301 includes fourteen transfer destination distribution informations "NHP1", "NHP2", "NHP3", "NHP4", ... "NHP14", which comprise an IP address of a next router as a next transmission destination, to which data are transferred, or an output port number for the transmission destination.

In accordance with the present invention, bit strings are not expanded. The retrieval table 300 stores the unexpanded bit strings as shown in FIG. 11. Instead of the expansion of the bit strings, the retrieval table 300 includes the VBIT field 303 for storing the bit information which indicates a position of the retrieval table 300, at which a transfer destination distribution information corresponding to the unexpanded bit string is present. Detail descriptions of the VBIT field 303 will be made later.

Figure 12:
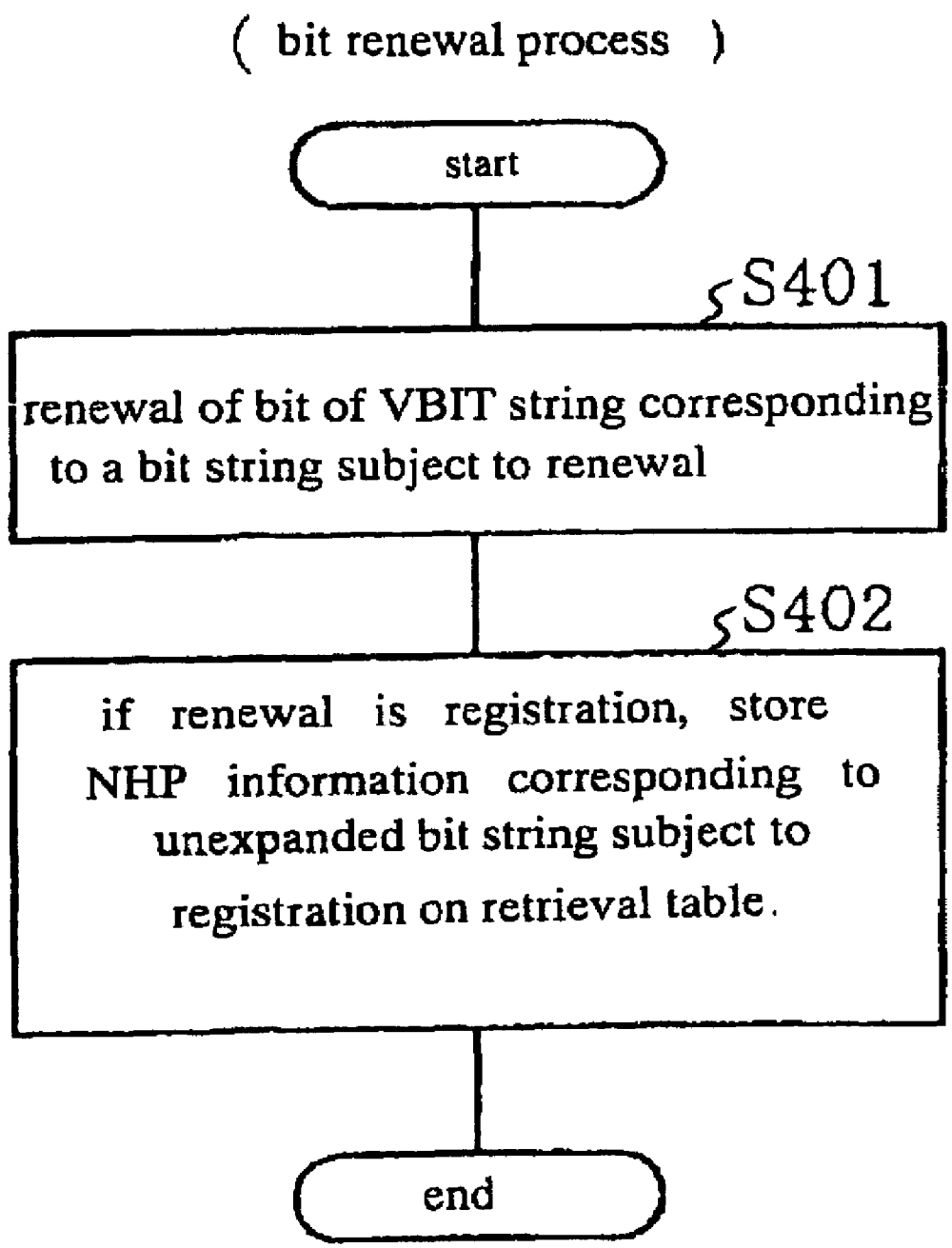
FIG. 12 is a flow chart illustrative of a bit renewal process for renewing the retrieval table shown in FIG. 11.

FIG. 12 is a flow chart illustrative of a bit renewal process for renewing the retrieval table shown in FIG. 11. In the step S410, a renewal is made of a bit in the VBIT field 303 corresponding to a bit string which is subject to the renewal. In the step S402, if the renewal is to register a transfer destination distribution information (NHP information) due to an establishment of a new route, then a transfer destination distribution information corresponding to an unexpanded bit string to be registered is stored on the retrieval table 300, and the bit renewal process is completed.

In accordance with the present invention, the renewal is made of one bit in the VBIT field 303 corresponding to the divided bit string which is subject to the renewal, and the transfer destination distribution information is stored on the retrieval table 300. For deleting a transfer destination distribution information corresponding to a predetermined bit string, a bit in the VBIT field 303 corresponding thereto is set "0", provided that a bit "0" represents non-registration, while another bit "1" represents registration.

Figure 13:
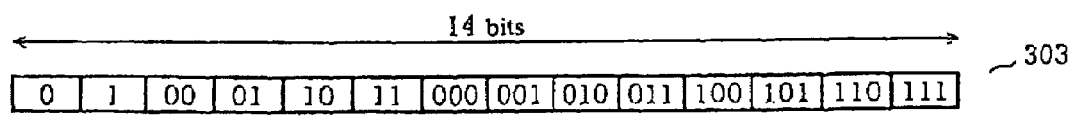
FIG. 13 is a diagram illustrative of a configuration of a VBIT field included in the retrieval table of FIG. 11.

FIG. 13 is a diagram illustrative of a configuration of the VBIT field 303 included in the retrieval table 300 of FIG. 11, provided that the divided bit string comprises 3-bits. The VBIT field 303 stores a bit string of 14-bits, which comprise any combinations of 1-bit to 3-bits. As described above, the bit strings are not expanded. If the bit string comprises a single bit, then there are two kinds of bit strings "0" and "1". If the bit string comprises two bits, then there are four kinds of bit strings "00", "01", "10" and "11". If the bit string comprises three bits, then there are eight kinds of bit strings "000", "001", "010", "011", "100", "101", "110", and "111". In total, fourteen kinds of bit strings are present. One bit is assigned for representing or designating one of the fourteen kinds of bit strings. Thus, the VBIT field 303 stores a bit string of 14-bits which representing or designating one of the fourteen kinds of bit strings.

For registering the transfer destination distribution information at a position corresponding to a bit string "00", a third bit "00" from the left is set "1" in the VBIT field 303, so that the transfer destination distribution information is stored in an entry "00" in the corresponding retrieval table. For deleting the transfer destination distribution information, in the VBIT field 303, a bit corresponding to the divided bit string for deletion is set "0". Registration, renewal and deletion to the retrieval table 300 may be made by the above-described simple operations to the VBIT field 303.

Figure 14:
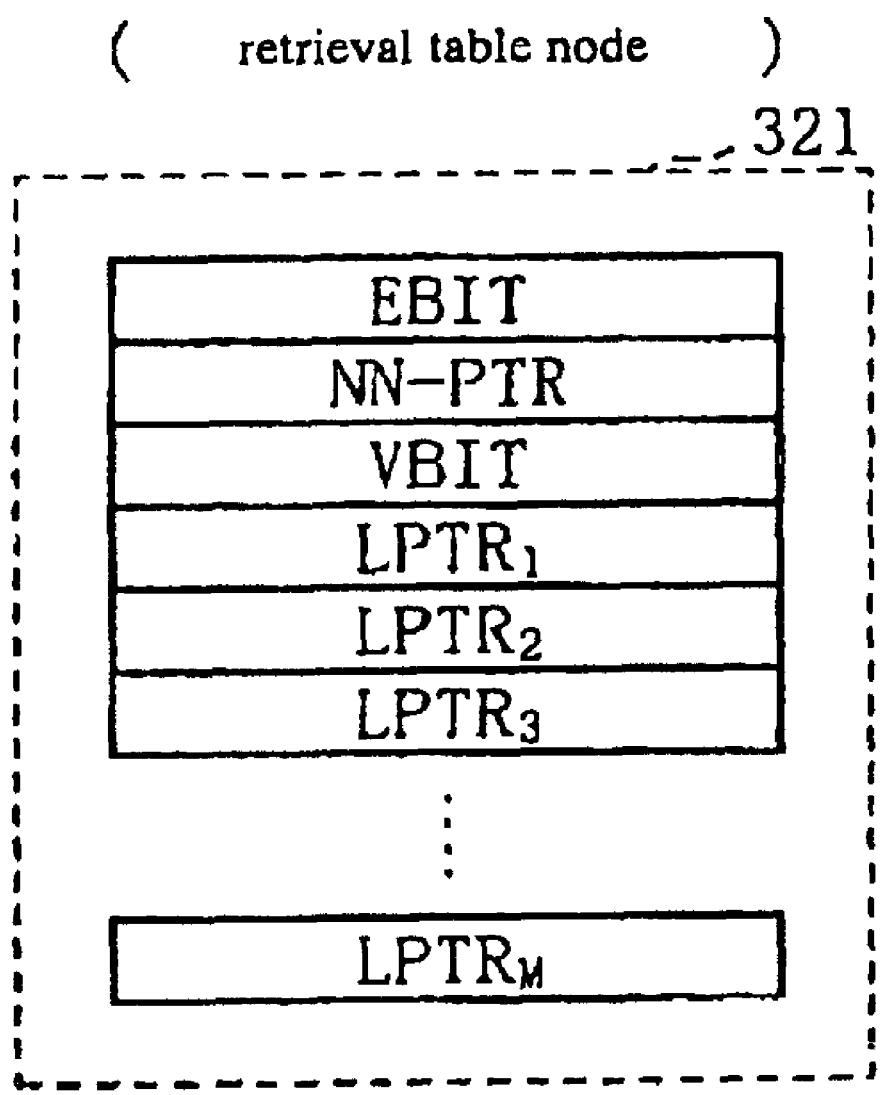
FIG. 14 is a view illustrative of a configuration of one node of the retrieval table included in the address retrieval apparatus shown in FIG. 10.

FIG. 14 is a view illustrative of a configuration of one node of the retrieval table 311 included in the address retrieval apparatus 310 shown in FIG. 10. The retrieval table 311 shown in FIG. 10 includes a retrieval table node 321 shown in FIG. 14. The retrieval table node 321 has a table structure for managing the divided bit strings by the hierarchical tree structure utilizing pointer. The retrieval table node 321 comprises a bit string EBIT, a pointer NN-PTR, a bit VBIT and pointers LPTR1~LPTR$_M$, provided that a value "M" depends on a bit number of the divided bit string and corresponds to the number of combinations of bits. If the divided bit string comprises 3-bits, then the value "M" is 8. The bit string EBIT identifies "enable" or "null" of the pointer LPTR to a retrieval table of a next or higher hierarchical level in the hierarchical tree structure. The pointer NN-PTR is a pointer to a node of the transfer destination distribution information table 315. The bit VBIT indicates a bit string registered on that node of the transfer destination distribution information table 315. Each of the pointers LPTR1~LPTR$_M$ is a pointer to a node of the retrieval table at the next or higher hierarchical level in the hierarchical tree structure.

Figure 15:
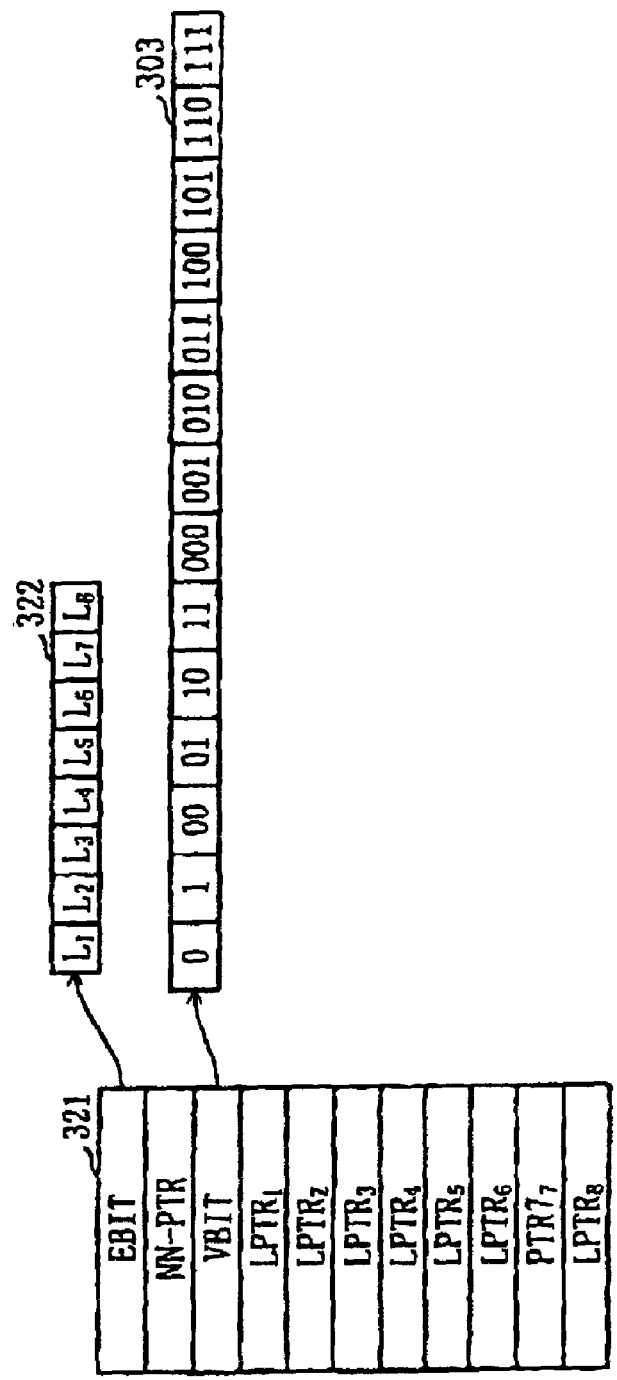
FIG. 15 is a view illustrative of an example of a configuration of the retrieval table node shown in FIG. 14.

FIG. 15 is a view illustrative of an example of a configuration of the retrieval table node 321 shown in FIG. 14. The retrieval table node 321 includes a bit string EBIT 322 comprising 8-bits "L1", "L2", "L3", "L4", "L5", "L6", "L7" and "L8", wherein the divided bit string comprises 3-bits. Each of the bits "L1", "L2", "L3", "L4", "L5", "L6", "L7" and "L8" of the bit string EBIT 322 respectively indicate "enable" or "null" of each of the pointers LPTR1~LPTR8.

The retrieval table node 321 includes a VBIT field 303 storing bits "0", "1", "00", "01", "10", "11", "000", "001", "010", "011", "100", "101", "110" and "111" which indicate whether fourteen kinds of divided bit strings "0", "1", "00", "01", "10", "11", "000", "001", "010", "011", "100", "101", "110" and "111" are registered on the retrieval table node 321. For example, the divided bit string "11" with a bit length "2" is registered on the retrieval table node 321, then the bit indicating the registration of the divided bit string "11" is "1", so that a transfer destination distribution information corresponding to the bit string "11" is stored in a node of the transfer destination distribution information table 315, wherein this node is designated by the pointer NN-PTR.

Figure 16:
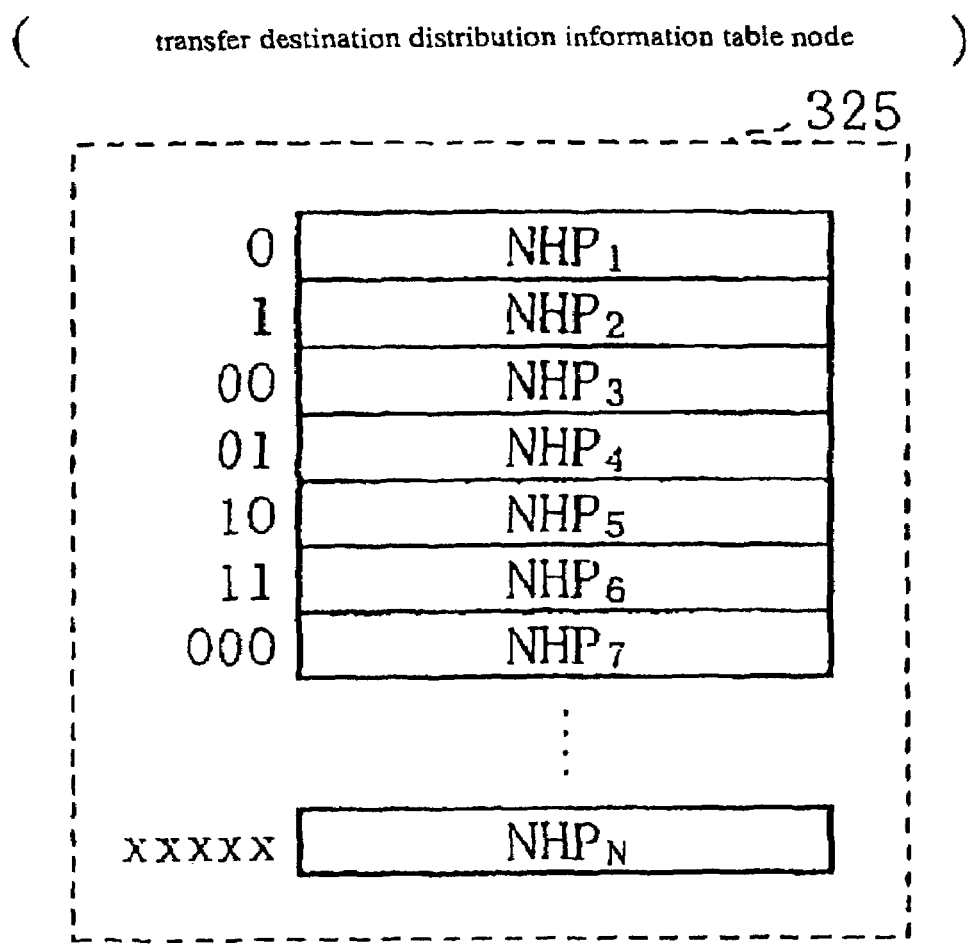
FIG. 16 is a diagram illustrative of one node of the transfer destination distribution information table shown in FIG. 10.

FIG. 16 is a diagram illustrative of one node 325 of the transfer destination distribution information table 315 shown in FIG. 10. The transfer destination distribution information table node 325 stores transfer destination distribution informations for the divided bit strings. If the divided bit string comprises 3-bits, then fourteen transfer destination distribution informations "NHP1", "NHP2", "NHP3", "NHP4", "NHP5", "NHP6", "NHP7", "NHP8", "NHP9", "NHP10", "NHP11", "NHP12", "NHP13" and "NHP14" for the fourteen kinds of divided bit strings "0", "1", "00", "01", "10", "11", "000", "001", "010", "011", "100", "101", "110" and "111" may be registered at maximum on the transfer destination distribution information table node 325.

With reference again to FIG. 10, the transfer destination distribution information table 315 comprises a plurality of the transfer destination distribution information table nodes 325, one of which is shown in FIG. 16. The transfer destination distribution information table 315 is referred by the pointer NN-PTR in the retrieval table 311. The transfer destination distribution information table node 325 comprises transfer destination distribution informations "NHP1" . . . "NHP$_N$" for all of the unexpanded bit strings. If the divided bit string comprises 3-bits, then there are fourteen kinds of divided bit strings "0", "1", "00", "01", "10", "11", "000", "001", "010", "011" "100", "101", "110" and "111". In this case, a parameter "N" is 14. Namely, the transfer destination distribution information table node 325 comprises fourteen transfer destination distribution informations "NHP1" . . . "NHP14" for all of the unexpanded bit strings "0", "1", "00", "01", "10", "11", "000", "001", "010", "011", "100", "101", "110" and "111". The bit string "xxxxx" corresponding to the transfer destination distribution information "NHP$_N$" depends upon the bit length of the divided bit string. If the bit length of the divided bit string is 3, the bit string "111" corresponding to the transfer destination distribution information "NHP14".

The divided bit string retrieval block 312 in the address retrieval apparatus 310 divides the input IP address 316 into a plurality of divided bit strings with a predetermined bit length, and retrieves values of the bit string EBIT and the pointer NN-PTR.

The transfer destination distribution information acquisition block 314 receives the retrieval result information 313 comprising the retrieved values of the bit string EBIT and the pointer NN-PTR from the divided bit string retrieval block 312, so that the transfer destination distribution information acquisition block 314 makes an access to the transfer destination distribution information table 315 in order to calculate a node which address is the pointer NN-PTR, whereby the transfer destination distribution information acquisition block 314 acquires the transfer destination distribution information 317 from the transfer destination distribution information table 315, and output the acquired transfer destination distribution information 317.

The address retrieval apparatus 310 shown in FIG. 10 does not limit the bit length of the IP address, the number of the divided bit strings derived from the single bit string, and the number of the hierarchical levels which are subjected to the retrievals of the divided bit strings. It will, hereby, be assumed that the bit length of the IP address is "9", the divisional number is "3" and the divided bit string length is "3". In this case, the value "M" representing the number of the pointers LPTR of the retrieval table node 321 is "8". Namely, there are eight pointers "LPTR1", "LPTR2", "LPTR3", "LPTR4", "LPTR1", "LPTR6", "LPTR7" and "LPTR8".

The bit string "EBIT" comprises 8-bits which indicates "enable" and "null" of each of the eight pointers "LPTR1", "LPTR2", "LPTR3", "LPTR4", "LPTR1", "LPTR6", "LPTR7" and "LPTR8". In case of the bit length "3", there are fourteen bit strings "0", "1", "00", "01", "10", "11", "000", "001", "010", "011", "100", "101", "110" and "111". Thus, the bit VBIT comprises 14-bits.

After the IP address comprises 9-bits is entered or inputted into the divided bit string retrieval block 312 in the address retrieval apparatus 310 shown in FIG. 10, then a prefix with a longest correspondence with the IP address is founded as described below.

Figure 17:
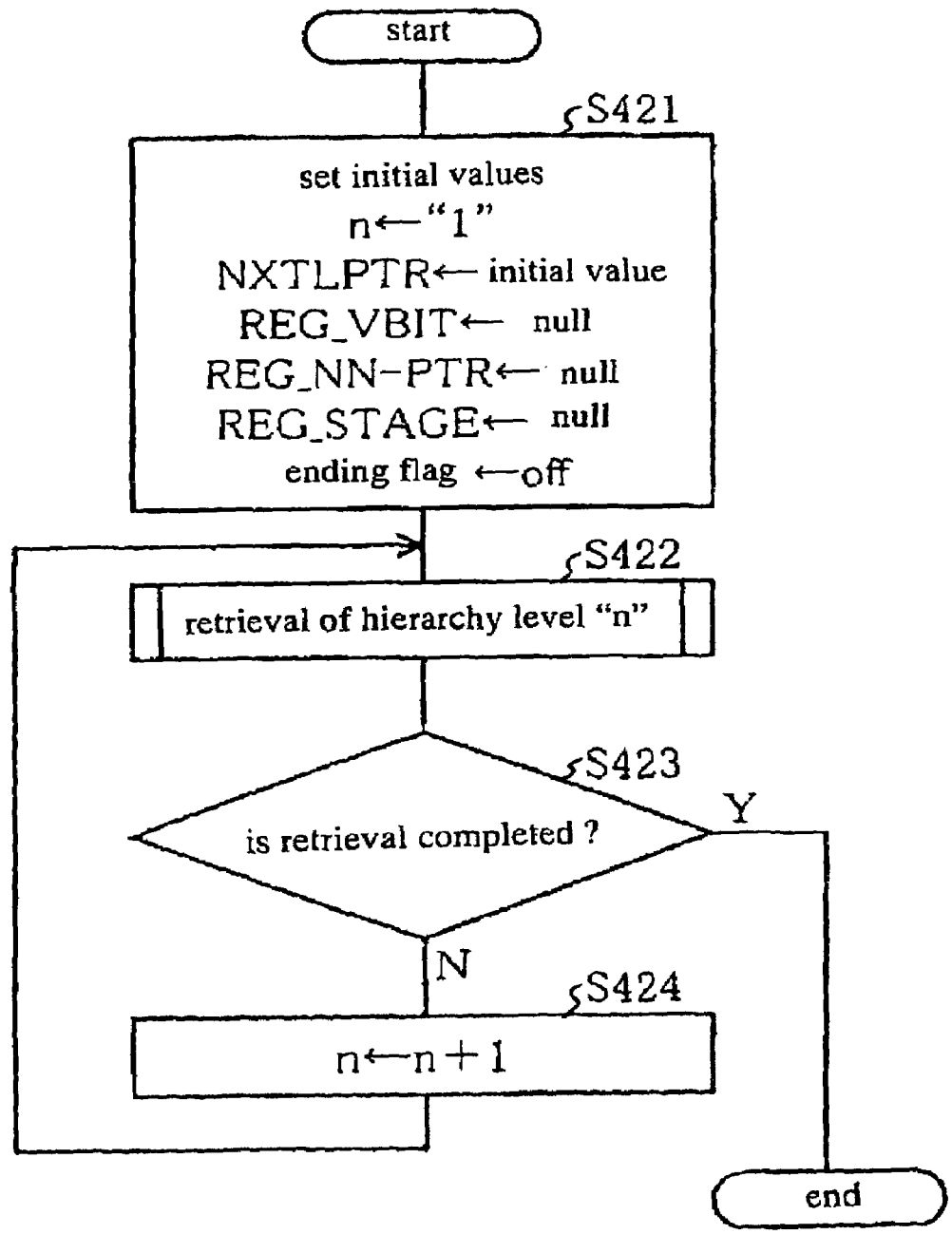
FIG. 17 is a flow chart illustrative of a retrieval operation by the divided bit string retrieval block based on the IP address which is subject to the retrieval in order to obtain the retrieval result information which is to be supplied to the transfer destination distribution information acquisition block included in the address retrieval apparatus shown in FIG. 10.

FIG. 17 is a flow chart illustrative of a retrieval operation by the divided bit string retrieval block 312 based on the IP address which is subject to the retrieval in order to obtain the retrieval result information 313 which is to be supplied to the transfer destination distribution information acquisition block 314 included in the address retrieval apparatus 310 shown in FIG. 10. There are founded parameters REG_VBIT, REG_NN-PTR, REG_STAGE which hold the VBIT field, the pointer NN-PTR and STAGE. If the hierarchical level number is 3, a variable "N" may be ranged "1" to "3".

The input IP address 316 is inputted into the divided bit string retrieval block 312 shown in FIG. 10. In the step S421, the divided bit string retrieval block 312 performs an initialization process prior to the retrieval process. In this initialization process, a parameter "n" representing a hierarchical level which is subject to the retrieval process is set "1". In the retrieval table 311, a pointer of the retrieval table node to the next or higher hierarchical level is set "NXTLPTR". A pointer address to a retrieval table node at a first hierarchical level is set as an initial value. The first hierarchical level is subject to the retrieval of the first bit string, for which reason there is a single retrieval table node.

The pointer REG_VBIT represents a pointer information to the VBIT field of the retrieval table node of the divided bit strings with the longest correspondence. The pointer REG_NN-PTR represents another pointer information to a node to the transfer destination distribution information table. This node will hereinafter be referred to as a transfer destination distribution information table node. The parameter REG_STAGE is a variable which holds a hierarchical level, at which the pointer REG_VBIT and the pointer REG_NN-PTR are renewed. Upon renewal of the pointer REG_VBIT and the pointer REG_NN-PTR, a value of the hierarchical level is assigned. An initial value of the parameter REG_STAGE is set "null" because any correspondent retrieval table node has not been found. In accordance with a computer program language, the initial value of the parameter REG_STAGE is set "negative value" or other variables, so as to indicate that the pointer REG_VBIT and the pointer REG_NN-PTR as well as the parameter REG_STAGE are "null".

An initial value of an ending flag is set "off" which indicates "null". If the retrievals of all hierarchical levels have been completed or if no further retrieval table node for retrieval has remained, then the ending flag becomes "on" which indicates "enable".

After the initializing process, a retrieval is made to the hierarchical level "n" in the step S422. Immediately after the initializing process, the variable "n" is "1", for which reason a retrieval is made to the retrieval table 311 at the first hierarchical level.

Figure 18:
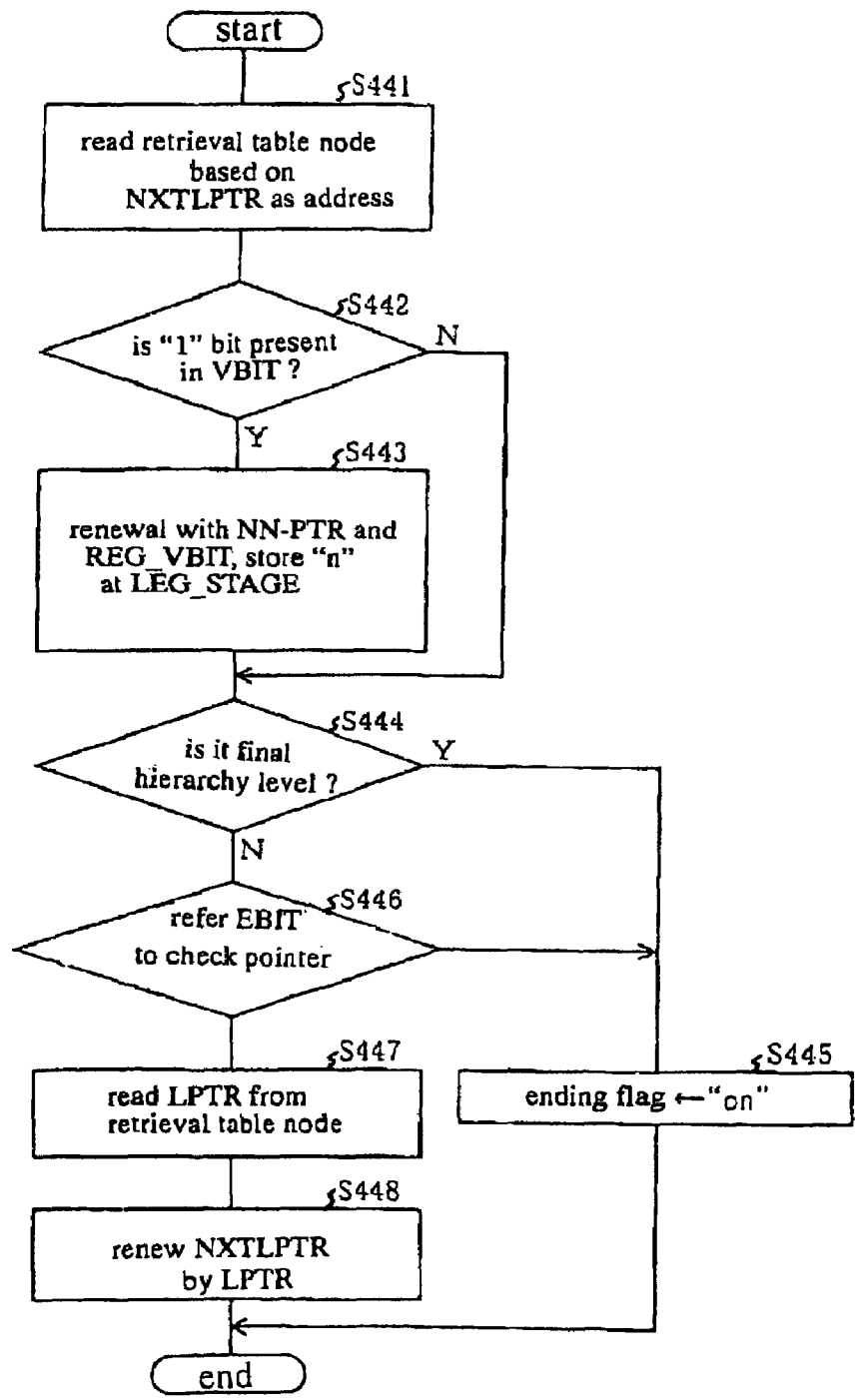
FIG. 18 is a flow chart illustrative of a retrieval process to the retrieval table in the step shown in FIG. 17.

FIG. 18 is a flow chart illustrative of a retrieval process to the retrieval table in the step S422 shown in FIG. 17. In the step S441, a single retrieval table node is read in accordance with a code "NXTLPTR" as an address. In the step S442, it is verified whether or not at least a bit "1" is present in the VBIT field of the read retrieval table node. If at least a bit "1" is present in the VBIT field, then this means that a divided bit string of the input IP address 316 is registered on this retrieval table node. In this case, the step S443 is then carried out. If none of the bit "1" is present in the VBIT field, then this means that any divided bit string of the input IP address 316 is not registered on this retrieval table node. The step S444 is then carried out with jumping the step S443.

As described above, if at least a bit "1" is present in the VBIT field, then this means that a divided bit string of the input IP address 316 is registered on this retrieval table node. The pointer REG_VBIT and the pointer REG_NN-PTR are renewed to the VBIT field and the pointer NN-PTR of the read retrieval table node. Further, the parameter REG_STAGE is written by the parameter "n". The transfer destination distribution information table node corresponding to the registered divided bit strings is absent in the retrieval table 311 but present in the transfer destination distribution information table 315. The pointer NN-PTR as the pointer to the transfer destination distribution information table node is present in the retrieval table node 321. Therefore, after the processes by the divided bit string retrieval block 312 have been completed, then the transfer destination distribution information acquisition block 314 acquires the transfer destination distribution information 317 from the transfer destination distribution information table 315 by utilizing the pointer REG_NN-PTR.

In the step S444, it is verified whether the hierarchical level now on retrieval is the final hierarchical level. In case of the hierarchical levels number "3", if the hierarchical level now on retrieval is the third hierarchical level, then this means that no further next or higher hierarchical level remains, for which reason the ending flag is made into "on" in the step S445.

If the hierarchical level now on retrieval is different from the final hierarchical level, then this means that the next or higher hierarchical level remains, then with reference to bits of the bit string EBIT, it is verified whether any retrieval table node is present or absent at the next or higher hierarchical level which is next to the read retrieval table node. In the step S446, with reference to the bits "L1", "L2", "L3", "L4", "L5", "L6", "L7" and "L8" of the bit string EBIT shown in FIG. 15, it is verified whether the eight pointers "LPTR1", "LPTR2", "LPTR3", "LPTR4", "LPTR1", "LPTR6", "LPTR7" and "LPTR8" corresponding to the 3-bits "000", "001", "010", "011", "100", "101", "110" and "111" are "enable" or "null". If "1" indicating "enable" is verified, then the step S447 is carried out. If "0" indicating "null" is verified, then the step S445 is carried out.

For example, the divided bit string of the IP address 316 being subject to the retrieval at the current hierarchical level is "010". In this case, if the bit L2 included in the bit string EBIT is "1" which indicates "enable", then this means that the retrieval table node at the next or higher hierarchical level is present, for which reason step S447 is carried out to read the pointer LPTR2 from the retrieval table node, and then in the step S448, the address NXTLPTR is re-written by the pointer LPTR2.

After the processes by the divided bit string retrieval block 312 is completed, then the transfer destination distribution information acquisition block 314 acquires the transfer destination distribution information 317 from the transfer destination distribution information table 315 based on the pointer REG_VBIT, the pointer REG_NN-PTR, the parameter REG_STAGE, and the input IP address 316 included in the retrieval result information 313 from the divided bit string retrieval block 312.

After the retrieval process has been made to the current retrieval hierarchical level, then in the step S444, it is judged whether or not the retrieval processes to all of the hierarchical levels have been completed. If the retrieval processes to all of the hierarchical levels have not yet been completed, then in the step S424, the parameter "n" is incremented by "1" to make the retrieval to the next or higher hierarchical level, and then the process will be back to step S422, so that the retrieval is made to the hierarchical level designated by the incremented parameter "n". Those processes will be repeated until the retrieval processes to all of the hierarchical levels have been completed.

In the step S423, if it is verified that the retrieval processes to all of the hierarchical levels have been completed, the retrieval processes of the divided bit strings of the input IP address 316 has been completed.

Figure 19:
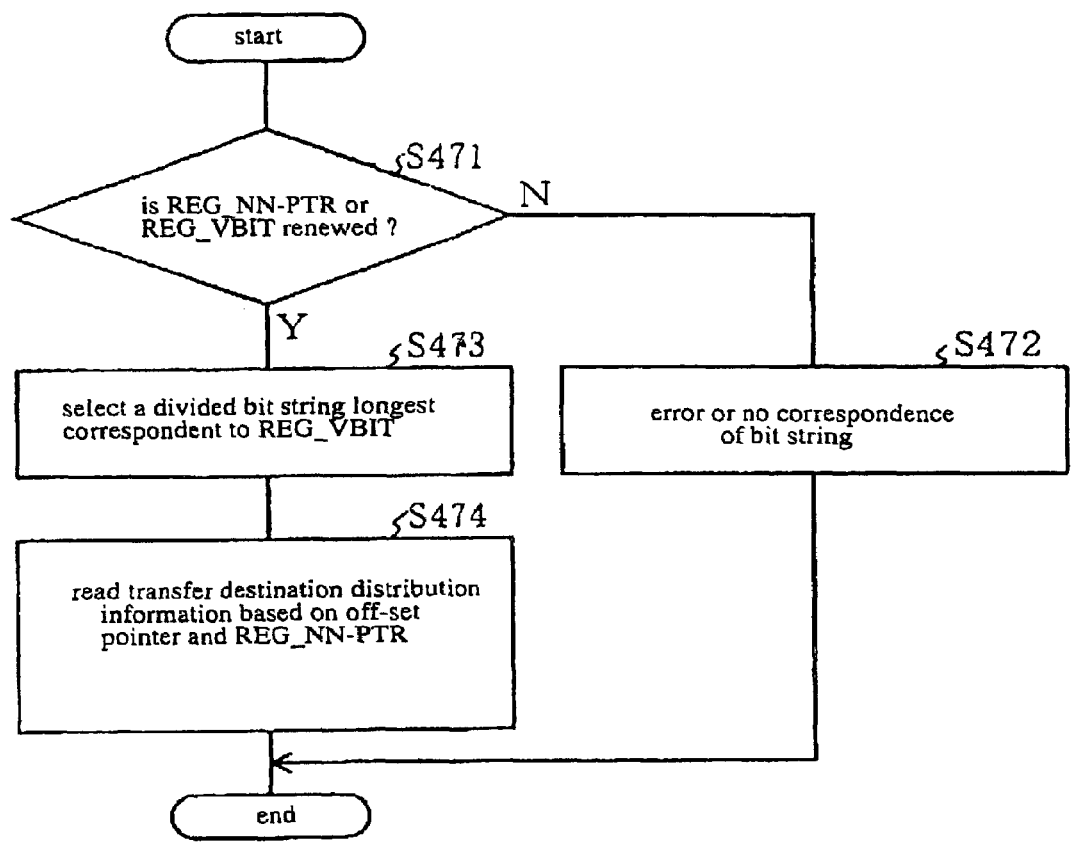
FIG. 19 is a flow chart illustrative of a process for acquiring the transfer destination distribution information by a transfer destination distribution information acquisition block in the address retrieval apparatus shown in FIG. 10.

FIG. 19 is a flow chart illustrative of a process for acquiring the transfer destination distribution information by the transfer destination distribution information acquisition block 314 in the address retrieval apparatus 310 shown in FIG. 10. In the step S471, it is verified whether or not the pointer REG_VBIT and the pointer REG_NN-PTR have been renewed by the divided bit string retrieval block 312. If the pointer REG_VBIT and the pointer REG_NN-PTR have not been renewed by the divided bit string retrieval block 312, then this means that in the step S443 in FIG. 18, no renewal has not been made during the retrieval processes for the divided bit strings, and thus the bit string corresponding to the input IP address has not been registered. In this case, a result indicating error or no correspondence of the bit string is outputted in the step S427.

If in the step S471, it is verified that the pointer REG_VBIT and the pointer REG_NN-PTR have been renewed by the divided bit string retrieval block 312, then this means that the renewed pointer REG_VBIT stores the VBIT field of the retrieval table node, to which the divided bit strings have finally been made corresponding, during the retrieval process by the divided bit string retrieval block 312. This VBIT field may be represented by the VBIT field 303 shown in FIG. 15. A bit string corresponding to the hierarchy REG_STAGE is fetched from the bit string of the input IP address, so that the fetched bit string is compared to the bit string represented by the VBIT, in order to select longer one of the fetched bit string and the VBIT bit string in the step S473.

The transfer destination distribution information 317 corresponding to the selected bit string is calculated from the pointer REG_NN-PTR and the selected bit string. The pointer REG_NN-PTR presents the head of the transfer destination distribution information table node 325 of FIG. 16, and selects any one of the transfer destination distribution informations "NHP1" . . . "NHP14" from the selected bit string in the step S474. If the bit string "010" is selected, the selected bit string "010" is positioned ninth from the left in the VBIT field 303 shown in FIG. 15. The transfer destination distribution information "NHP9" is acquired as the transfer destination distribution information 317 by the transfer destination distribution information acquisition block 314 from the transfer destination distribution information table 315.

Operations of the address retrieval apparatus 310 of the present invention shown in FIG. 10 will be described, assuming that the bit length of the IP address is "9", the division number is "3" and the divided bit string length is "3".

FIG. 20 is a view illustrative of an IP address registered on the retrieval table 311 included in the address retrieval apparatus 310 shown in FIG. 10. Namely, five IP addresses P1, P2, P3, P4 and P5 are registered on the retrieval table 311 included in the address retrieval apparatus 310 shown in FIG. 10. The IP address P1 has a bit length "2". The IP address P2 has a bit length "5". The transfer destination distribution information 317 include transfer destination distribution informations "NHP(P1)", "NHP(P2)", "NHP(P3)", "NHP(P4)" and "NHP(P5)" which correspond to the IP addresses P1, P2, P3, P4 and P5, respectively.

Figure 21:
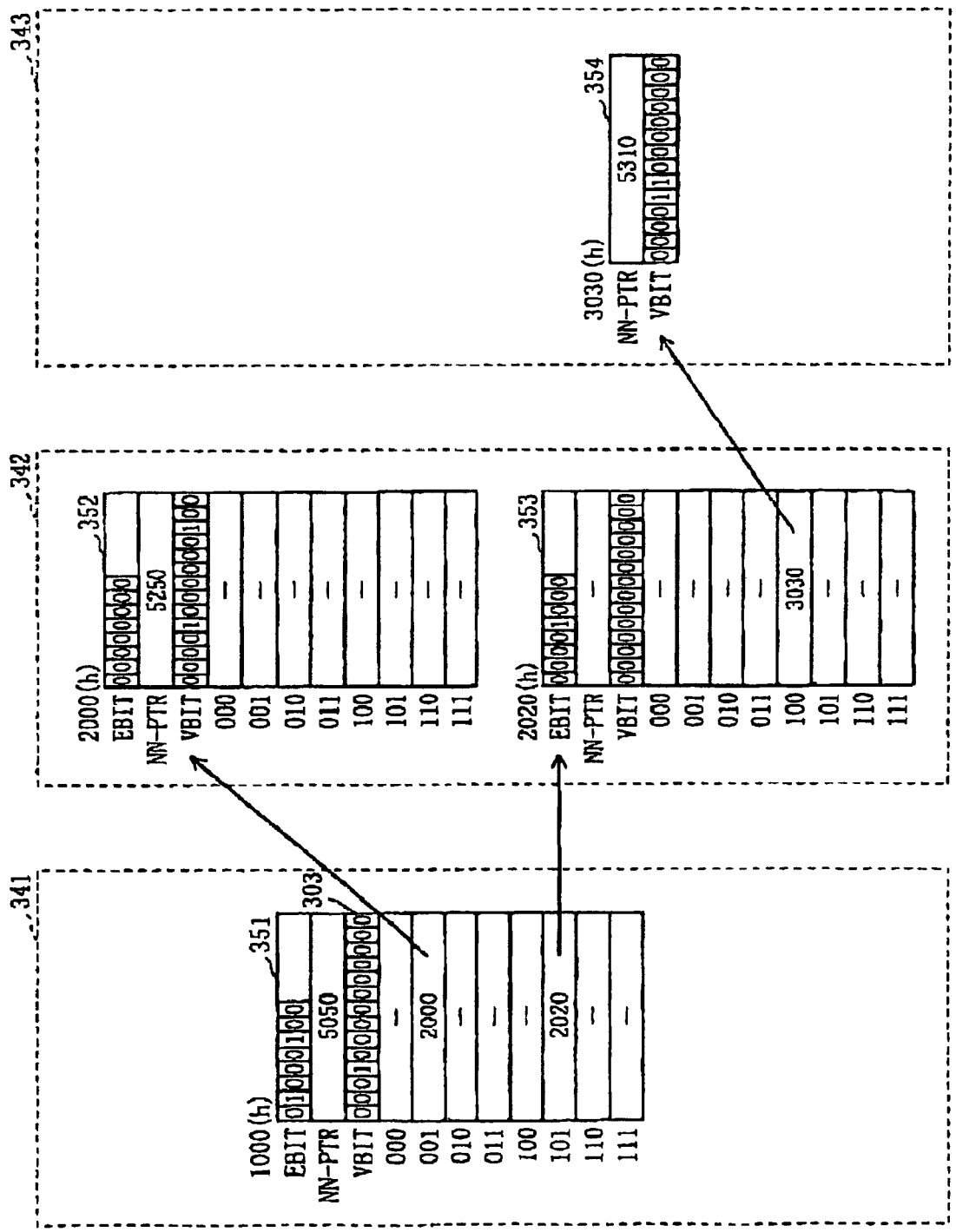
FIG. 21 is a view illustrative of IP retrieval tables at first, second and third hierarchical levels, provided that five IP addresses are registered on the retrieval table included in the address retrieval apparatus shown in FIG. 10.
Figure 22:
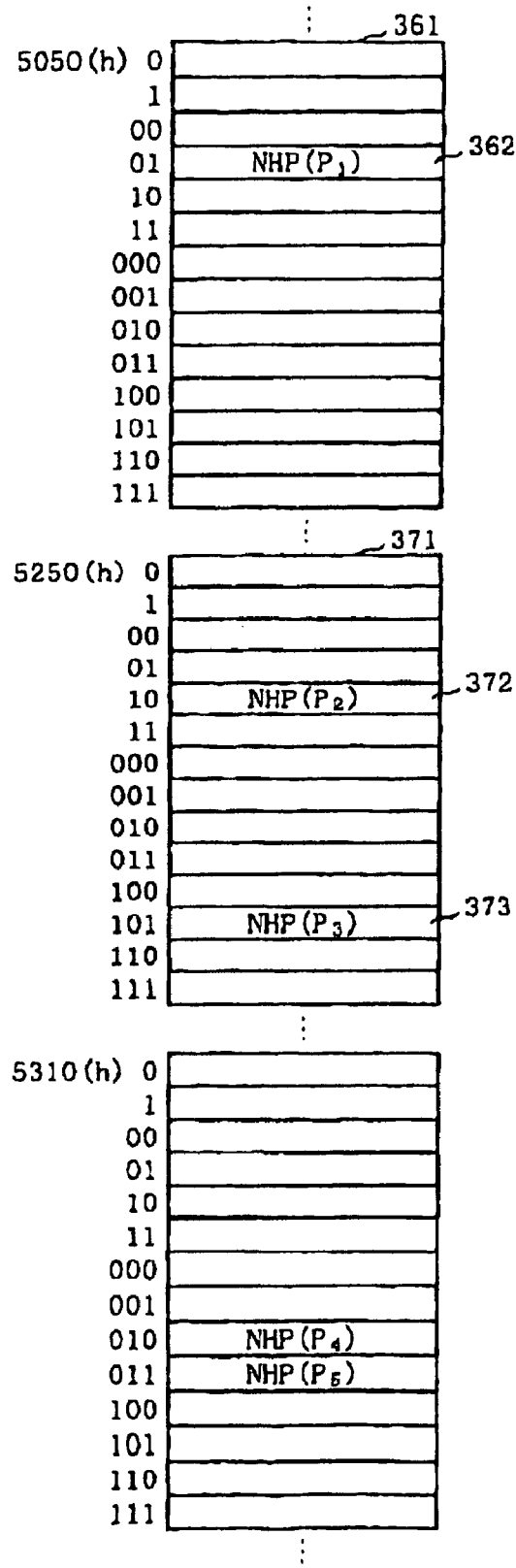
FIG. 22 is a view illustrative of transfer destination distribution information tables, provided that five IP addresses are registered on the retrieval table included in the address retrieval apparatus shown in FIG. 10.

FIG. 21 is a view illustrative of IP retrieval tables 341, 342 and 343 at first, second and third hierarchical levels, provided that the five IP addresses P1, P2, P3, P4 and P5 are registered on the retrieval table 311 included in the address retrieval apparatus 310 shown in FIG. 10. FIG. 22 is a view illustrative of transfer destination distribution information tables 361, 371, . . . , provided that the five IP addresses P1, P2, P3, P4 and P5 are registered on the retrieval table 311 included in the address retrieval apparatus 310 shown in FIG. 10.

The IP retrieval table 343 at the third hierarchical level is a table of the final and top hierarchical level of the divided bit strings and thus the IP retrieval table 343 does not need a pointer to the retrieval table node at the next or higher hierarchical level. The IP retrieval table 343 at the third or highest hierarchical level does not need the bit string EBIT and the transfer destination distribution informations "NHP1", "NHP2", "NHP3", "NHP4", "NHP5", "NHP6", "NHP7" and "NHP8", while the IP retrieval tables 341 and 342 at the first and second hierarchical levels do need the bit string EBIT and the transfer destination distribution informations "NHP1", "NHP2", "NHP3", "NHP4", "NHP5", "NHP6", "NHP7" and "NHP8".

Since a bit string "01" of the IP address P1 has a bit length "2", the registration is made onto the IP retrieval table 341 at the first hierarchical level. A fourth bit from the left which corresponds to the bit string "01" in the VBIT field in the retrieval table node 351 becomes "1". A transfer destination distribution information table node corresponding to this retrieval table node 351 is designated by the pointer NN-PTR. In the example shown in FIG. 22, a transfer destination distribution information table node 361 is designated by an address "5050(h)". The transfer destination distribution information is a transfer destination distribution information "NHP(P1)" registered on a table 362 designated by the bit string "01".

Since a bit string "00110" of the IP address P2 has a bit length "5", the registration is made onto the IP retrieval table 342 at the second hierarchical level. It is necessary that the pointer to the retrieval table node at the second hierarchical level is registered or stored on the IP retrieval table 341 at the first hierarchical level. Therefore, a pointer "2000(h)" to the retrieval table node at the second hierarchical level is registered or stored on a table which corresponds to a bit string "001" of a retrieval table node 351 at the first hierarchical level. Further, a bit of the bit string EBIT corresponding to the bit string "001" becomes "1". The retrieval table node 352 designated by this pointer is as shown in FIG. 21.

A bit string at the second hierarchical level of the IP address P2 comprises a 2-bit string "10" which is the remaining two bits of the bit string "00110" of the IP address P2, other than the first three bits "001" of the bit string "00110" of the IP address P2. A fifth bit from the left designated by the bit string "10" in the VBIT field becomes "1". A transfer destination distribution information table node corresponding to this retrieval table node 352 is designated by the pointer NN-PTR. In the example shown in FIG. 22, a transfer destination distribution information table node 371 is designated by an address "5250(h)". The transfer destination distribution information is a transfer destination distribution information "NHP(P2)" registered on a table 372 designated by the bit string "10".

Since a bit string "001101" of the IP address P3 has a bit length "6", the registration is made onto the IP retrieval table 342 at the second hierarchical level. It is necessary that the pointer to the retrieval table node at the second hierarchical level is registered or stored on the IP retrieval table 341 at the first hierarchical level. The same bit string as the IP address P2 is present at the first hierarchical level. The table corresponding to the bit string "001" on the retrieval table node 351 at the first hierarchical level and the retrieval table node 352 at the second hierarchical level are common to both the IP addresses P2 and P3. Since the bit string at the second hierarchical level from the IP address P3 is "101", a twelfth bit from the left which corresponds to the bit string "101" in the VBIT field in the retrieval table node 352 becomes "1". A transfer destination distribution information table node corresponding to this retrieval table node 352 is designated by the same pointer NN-PTR as the IP address P2. In the example shown in FIG. 22, the transfer destination distribution information table node 371 is designated by the address "5250(h)". The transfer destination distribution information is a transfer destination distribution information "NHP(P3)" registered on a table 373 designated by the bit string "101".

Since bit strings "10110010" and "10110011" of the IP addresses P4 and P5 have a bit length "8", the registration is made onto the IP retrieval table 343 at the third hierarchical level. It is necessary that the pointer to the retrieval table node at the second hierarchical level is registered or stored on the IP retrieval table 341 at the first hierarchical level. Therefore, a pointer "2020(h)" to the IP retrieval table 343 at the second hierarchical level is registered or stored on a table which corresponds to a bit string "101" of the retrieval table node 351 at the first hierarchical level. Further, a bit of the bit string EBIT corresponding to the bit string "101" becomes "1". The retrieval table node 353 designated by this pointer is as shown in FIG. 21.

Furthermore, it is necessary that the pointer to the retrieval table node at the third hierarchical level is registered or stored on the IP retrieval table 342 at the second hierarchical level. Therefore, a pointer "3030(h)" to the IP retrieval table 343 at the third hierarchical level is registered or stored on a table which corresponds to a bit string "100" of the retrieval table node 353 at the second hierarchical level. Further, a bit of the bit string EBIT corresponding to the bit string "100" becomes "1". As shown in FIG. 20, no registration is made of the IP address, wherein the bit string at the first hierarchical level is "101" and the bit length is ranged from "4" to "6". For this reason, all bits of the VBIT field are "0". The pointer NN-PTR does not designate any transfer destination distribution information table nodes. The retrieval table node 354 at the third hierarchical level corresponding to the IP addresses P4 and P5 is as shown in FIG. 21. In this example, the number of the hierarchical levels is "3". Thus, the third hierarchical level is the top hierarchical level. The retrieval table node 354 at the third hierarchical level does not need any pointer to the next hierarchical level retrieval table node. It is, therefore, possible to delete tables storing the bit string EBIT and the pointers "LPTR1", "LPTR2", "LPTR3", "LPTR4", "LPTR5", "LPTR6", "LPTR7" and "LPTR8" from the retrieval table node 354 at the third hierarchical level.

Operations of the address retrieval apparatus 310 shown in FIG. 10 will be described upon receipt of an input of an IP address 316 which is subject to the retrieval under the condition that the five IP addresses are registered on the IP retrieval tables 341, 342 and 343 at the first, second and third hierarchical levels included in the retrieval table 311 included in the address retrieval apparatus 310.

Operations of the address retrieval apparatus 310 will be described, assuming that the input IP address 316 comprises a bit string "001101111". Upon input of the input IP address 316 into the divided bit string retrieval block 312, the step S421 shown in FIG. 17 is carried out for initialization to the variables. Then, a read operation is made to the retrieval table node designated by the address "NXTPTR". If an address "1000(h)" is assigned to the first retrieval table node, then an initial value of the address "NXTPTR" is "1000(h)". In the step S441 shown in FIG. 18, the read operation is made for the retrieval table node 351 designated by the address "1000(h)".

It is verified whether or not the VBIT field has correspondences with bit strings ranged of bit length from "1" to "3" at the first hierarchical level, for example, "0", "00" and "001". "1" means the correspondence with the bit strings. The VBIT field includes fourteen bits which represent correspondences with bit strings ranged of bit length from "1" to "3" at the first hierarchical level, for example, "0", "1", "00", "01", "10", "11", "000", "001", "010", "011", "100", "101", "110" and "111". Since in the step S442, it is verified the VBIT field has bits "0" corresponding to the bit strings "0", "00" and "001", then the step 444 is carried out following to the step S442 with jumping the step S443.

Since the divided bit strings at the first hierarchical level of the input IP address 316 is subject to the current retrieval, then the parameter "n" is "1", and thus there is the retrieval table node at the next hierarchical level, for which reason the step S446 is then carried out, wherein it is verified that a bit of the bit string EBIT corresponding to the divided bit string "001" is "1" which indicates that a pointer is present to the retrieval table node at the next hierarchical level in the step S446. In the step S447, a pointer LPTR corresponding to the divided bit string "001" is read out of the retrieval table node. The pointer LPTR is "2000(h)". The address "NXTLPTR" is renewed to "2000(h)" in the step S448. The retrieval process at the first hierarchical level has been completed, while in the step S423, the ending flag remains "off", which means that the retrieval process at the next hierarchical level has not been completed. Thus, the step S424 is carried out, wherein the parameter "n" is incremented by "1". Based on the parameter "2", the retrieval process is made in the step S422.

The renewed address "NXTLPTR" is "2000(h)". In the step S441, the read operation is made for the retrieval table node 352 at the second hierarchical level. In the VBIT field, bits "1" are present corresponding to all second hierarchical level divided bit strings "1", "10" and "101" in the range of bit length from "1" to "3" in the step S442. The pointer REG_NN-PTR and the pointer REG_VBIT are written or stored in the pointer NN-PTR and the VBIT field. The parameter "N" is stored in the parameter REG_STAGE in the step S443. Since the parameter "n" is "2", then this means the hierarchical level at which the current retrieval is made is not the final or top hierarchical level, and there is the next hierarchical level for the next retrieval. The next step S446 is carried out, wherein the bit string EBIT has a bit "0" which corresponds to the divided bit string "101" at the second hierarchical level of the IP address 316. This indicates that there is no pointer LPTR to the next hierarchical level for the next retrieval. In the step S445, the ending flag becomes "on". In the step S423, the ending flag "on" is verified, whereby the retrieval process for the divided bit strings of the input IP address 316 has been completed.

After the retrieval process for the divided bit strings of the input IP address 316 has been completed, then the divided bit string retrieval block 312 supplies the transfer destination distribution information acquisition block 314 with the retrieval result information 313 which includes the pointer REG_VBIT, the pointer REG_NN-PTR, the parameter REG_STAGE and the input IP address 316.

Processes by the transfer destination distribution information acquisition block 314 will be described with reference again to FIG. 19. An attention is made onto the pointer REG_VBIT and the pointer REG_NN-PTR. In the step S443 shown in FIG. 18, the pointer REG_VBIT is renewed to "00001000000100", while the pointer REG_NN-PTR is renewed to "5250(h)". It is verified that the renewal has been made in the step S471. The step S473 is carried out, wherein the parameter REG_STAGE is "2". It is verified whether any bit string designated by the VBIT field of the pointer REG_VBIT, which corresponds to the it string "101" at the second hierarchical level of the IP address. It is verified that bit strings "10" and "101" are present. The longest-corresponding bit string "101" is selected in the step S473. Since the pointer REG_NN-PTR is "5250(h)", this pointer indicates the transfer destination distribution information table node 371 shown in FIG. 22. The bit string of the pointer REG_VBIT is compared to the bit string of the input IP address. It is verified that the corresponding bit string is "101". In the step S474, the transfer destination distribution information "NHP(P3)" is read out of a table designated by the bit string "101" on a transfer destination distribution information table node 371 designated by the pointer "5250 (h)".

Figure 23:
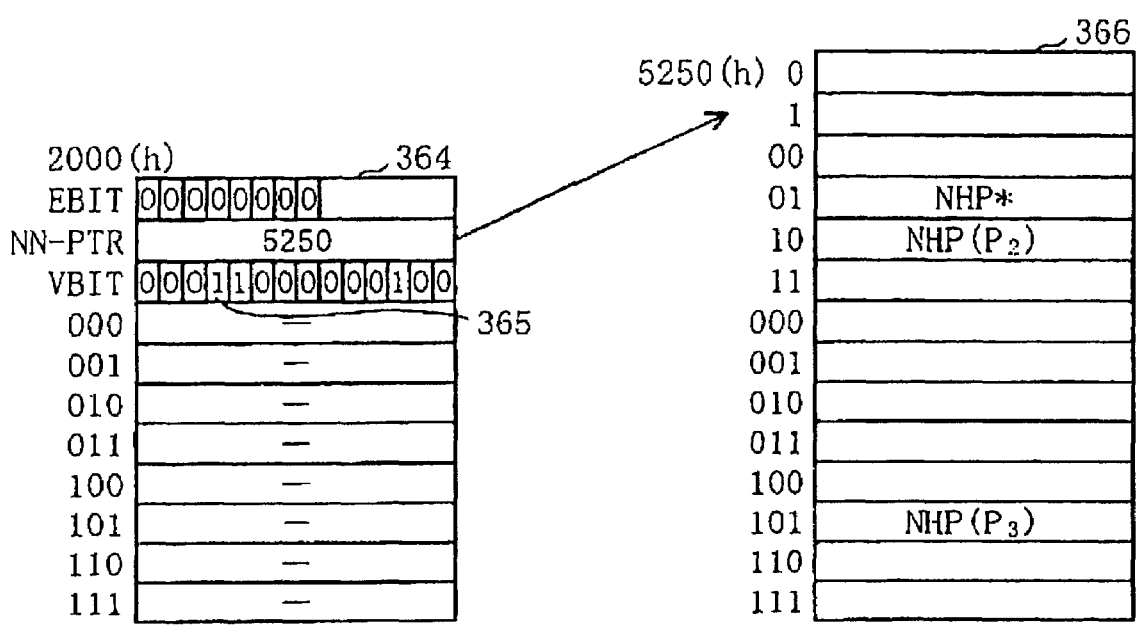
FIG. 23 is a view illustrative of a retrieval table node at a second hierarchical level and a retrieval table node of a transfer destination distribution information table included in the address retrieval apparatus shown in FIG. 10.

FIG. 23 is a view illustrative of a retrieval table node 364 at a second hierarchical level and a retrieval table node 366 of the transfer destination distribution information table 315 included in the address retrieval apparatus 310 shown in FIG. 10. With reference to FIG. 23, processes for registering a bit string "10101" onto the retrieval table shown in FIG. 21 and the transfer destination distribution information table shown in FIG. 22 will be described. For renewal of the table, a value of the corresponding bit in the VBIT field is inverted to "0" which means deletion or "1" which means registration. Bit strings "10" and "101" are registered on the retrieval table node 352 at the second hierarchical level, wherein the bit string "10" is stored at a fifth bit "1" from the left, while the bit string "101" is stored at a third bit "1" from the left as shown in FIG. 21. A new bit string "01" will further be registered on the retrieval table node 352 through the following processes. In the VBIT field, a fourth bit 365 from the left is set "1", wherein the fourth bit 365 corresponds to the bit string "01" on the retrieval table node 364 at the second hierarchical level. A transfer destination distribution information "NHP*" is stored at a table designated by the bit string "01" on the retrieval table node 366 included in the transfer destination distribution information table 315. In FIG. 23, the bit string "01" and the transfer destination distribution information "NHP*" are registered on the IP retrieval tables shown in FIGS. 21 and 22.

Figure 9:
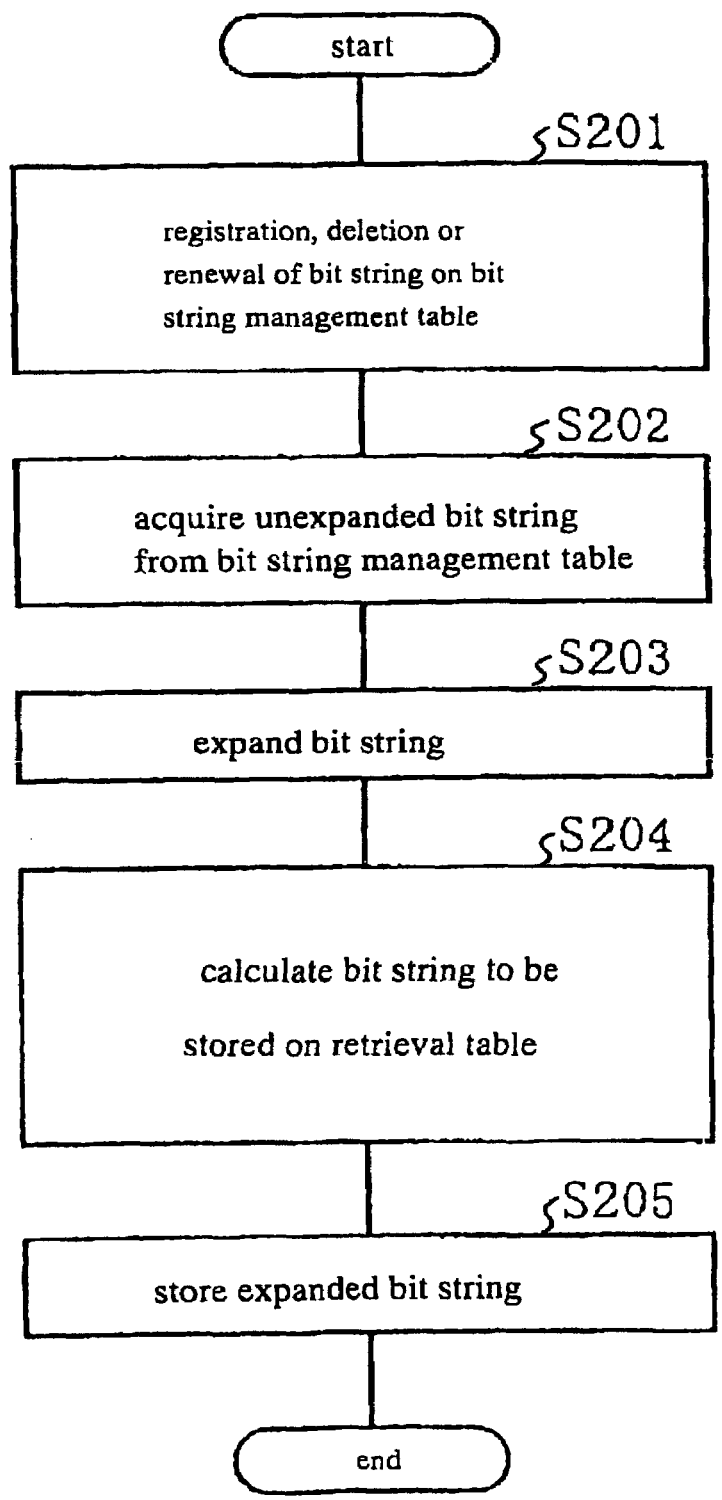
FIG. 9 is a flow chart illustrative of sequential steps of a bit renewal process involved in registration, deletion and renewal processes for bit strings on the retrieval table in the conventional address retrieval apparatus shown in FIG. 8.

In accordance with the conventional renewal process for the retrieval table described above, the expanded bit strings are stored on the retrieval table, while the original bit strings do not remain on this retrieval table. For this reason, the original bit strings are held on the bit string management table 122 shown in FIG. 8. Namely, the bit string management table 122 is essential in addition to the retrieval table 121 shown in FIG. 8. Further, for the conventional renewal process for the retrieval table described above, the complicated additional processes shown in FIG. 9 are essential for the renewal of the retrieval table 121 shown in FIG. 8.

In accordance with the novel address retrieval apparatus 310 shown in FIG. 10, the renewal of the retrieval table may be realized by the above-described extremely simple processes shown in FIG. 11, wherein the VBIT field 303 corresponding to the unexpanded bit string and the transfer destination distribution information are re-written. Further, the novel address retrieval apparatus 310 needs only the retrieval table 311. This allows a reduction of the memory size.

In accordance with the conventional technique disclosed in Japanese laid-open patent publication No. 11-191781, the retrieval tables at all the hierarchical levels need both the pointer to the table node at the next hierarchical level and the transfer destination distribution information table.

In accordance with the novel address retrieval apparatus 310 shown in FIG. 10, there are two isolated tables, wherein one has only the pointer to the table node at the next hierarchical level as shown in FIG. 14, while another has the transfer destination distribution information shown in FIG. 16, so that if any retrieval table free of registration of the bit strings is present in the IP retrieval table 342 at the second hierarchical level or in the IP retrieval table 343 at the third hierarchical level, then it is possible to omit this retrieval table to reduce the amount of the tables.

Second Embodiment

Figure 24:
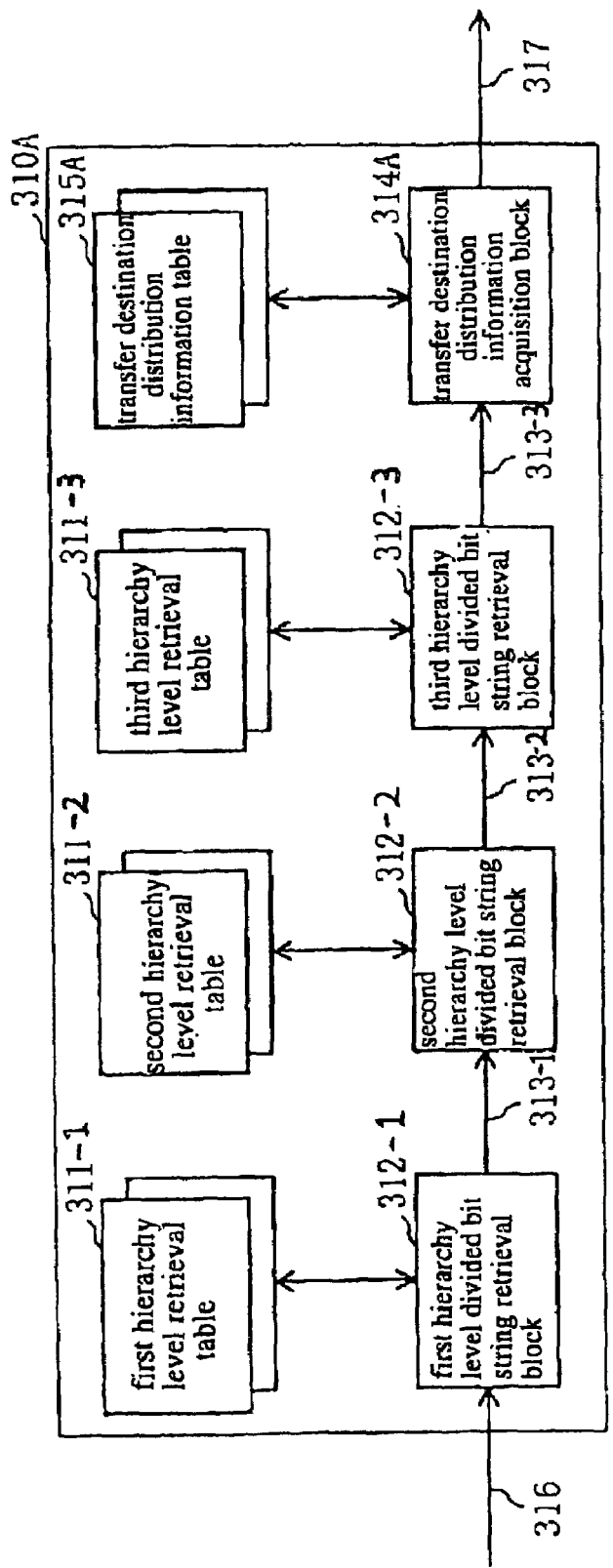
FIG. 24 is a block diagram illustrative of a configuration of a novel address retrieval apparatus in a second embodiment in accordance with the present invention.

A second embodiment according to the present invention will be described in detail with reference to the drawings. FIG. 24 is a block diagram illustrative of a configuration of a novel address retrieval apparatus in a second embodiment in accordance with the present invention. In accordance with the above-described novel address retrieval apparatus 310 shown in FIG. 10 in the first embodiment of the present invention, the retrieval table 311 comprises a single united set of plural retrieval table nodes at plural different hierarchical levels. In accordance with this second embodiment of the present invention, each set of a retrieval table and a divided bit string retrieval block is provided for each of plural different hierarchical levels, so as to allow parallel retrieval processes at the plural different hierarchical levels for realizing high speed retrieval processes. The following descriptions will focus on differences of the second embodiment from the above first embodiment to avoid any duplicate descriptions.

As shown in FIG. 24, a novel address retrieval apparatus 310A includes a series connection of first to third hierarchical level divided bit string retrieval blocks 312-1, 312-2 and 312-3. The novel address retrieval apparatus 310A also includes first to third hierarchical level retrieval tables 311-1, 311-2 and 311-3 functionally coupled to the first to third hierarchical level divided bit string retrieval blocks 312-1, 312-2 and 312-3 respectively. The first hierarchical level retrieval table 311-1 and the first hierarchical level divided bit string retrieval block 312-1 makes a first pair for retrieval process at the first hierarchical level. The second hierarchical level retrieval table 311-2 and the second hierarchical level divided bit string retrieval block 312-2 makes a second pair for retrieval process at the second hierarchical level. The third hierarchical level retrieval table 311-3 and the third hierarchical level divided bit string retrieval block 312-3 makes a third pair for retrieval process at the third hierarchical level. The first to third pairs perform parallel retrieval processes for the first to third hierarchical levels. The novel address retrieval apparatus 310A also includes a transfer destination distribution information acquisition block 314A positioned at a follower stage to the third hierarchical level divided bit string retrieval block 312-3. The novel address retrieval apparatus 310A also includes a transfer destination distribution information table 315A functionally coupled to the transfer destination distribution information acquisition block 314A.

The first hierarchical level divided bit string retrieval block 312-1 receives an input of the IP address and refers to the first hierarchical level retrieval table 311-1 for performing a first hierarchical level retrieval process to generate a first hierarchical level retrieval result information 313-1.

The second hierarchical level divided bit string retrieval block 312-2 receives the first hierarchical level retrieval result information 313-1 from the first hierarchical level divided bit string retrieval block 312-1, and refers to the second hierarchical level retrieval table 311-2 for performing a second hierarchical level retrieval process to generate a second hierarchical level retrieval result information 313-2.

The third hierarchical level divided bit string retrieval block 312-3 receives the second hierarchical level retrieval result information 313-2 from the second hierarchical level divided bit string retrieval block 312-2, and refers to the third hierarchical level retrieval table 311-3 for performing a third hierarchical level retrieval process to generate a third hierarchical level retrieval result information 313-3.

The transfer destination distribution information acquisition block 314A receives the third hierarchical level retrieval result information 313-3 from the third hierarchical level divided bit string retrieval block 312-3, and refers to the transfer destination distribution information table 315A for acquiring the transfer destination distribution information 317 from the transfer destination distribution information table 315A based on the third hierarchical level retrieval result information 313-3 from the third hierarchical level divided bit string retrieval block 312-3.

The address retrieval apparatus 310A is free of any limitations to the bit length of the IP address, the number of the hierarchical levels, and the bit length of the divided bit strings. The descriptions will be made assuming that the bit length of the IP address is "9", the number of the hierarchical levels is "3", and the bit length of the divided bit strings is "3". The number of the sets or pairs of the retrieval table and the divided bit string retrieval block is adjusted to the number of the hierarchical levels.

Upon receipt of the input IP address 316, the first hierarchical level divided bit string retrieval block 312-1 performs the above-described first hierarchical level retrieval processes in the steps S441 to S448 shown in FIG. 18, wherein the parameter "n" is set "1" through the initialization made in the step S421 shown in FIG. 17. After the first hierarchical level retrieval processes have been completed by the first hierarchical level divided bit string retrieval block 312-1, then the first hierarchical level divided bit string retrieval block 312-1 supplies the second hierarchical level divided bit string retrieval block 312-2 with the first hierarchical level retrieval result information 313-1, which includes the ending flag, the address "NXTLPTR", the pointer REG_VBIT, the pointer REG_NN-PTR, the parameter REG_STAGE and the bit string of the IP address.

Upon receipt of the first hierarchical level retrieval result information 313-1 from the first hierarchical level divided bit string retrieval block 312-1, the second hierarchical level divided bit string retrieval block 312-2 verifies whether or not the ending flag included in the first hierarchical level retrieval result information 313-1 is "on" or "off". If the ending flag is "off", the second hierarchical level divided bit string retrieval block 312-2 performs the above-described second hierarchical level retrieval processes in the steps S441 to S448 shown in FIG. 18, wherein the parameter "n" is set "2" through the initialization made in the step S421 shown in FIG. 17. After the second hierarchical level retrieval processes have been completed by the second hierarchical level divided bit string retrieval block 312-2, then the second hierarchical level divided bit string retrieval block 312-2 supplies the third hierarchical level divided bit string retrieval block 312-3 with the second hierarchical level retrieval result information 313-2, which includes the ending flag, the address "NXTLPTR", the pointer REG_VBIT, the pointer REG_NN-PTR, the parameter REG_STAGE and the bit string of the IP address. If the ending flag is "on", the second hierarchical level divided bit string retrieval block 312-2 does not perform the second hierarchical level retrieval processes and does supply the third hierarchical level divided bit string retrieval block 312-3 with the received first hierarchical level retrieval result information 313-1 as the second hierarchical level retrieval result information 313-2.

Upon receipt of the second hierarchical level retrieval result information 313-2 from the second hierarchical level divided bit string retrieval block 312-2, the third hierarchical level divided bit string retrieval block 312-3 verifies whether or not the ending flag included in the second hierarchical level retrieval result information 313-2 is "on" or "off". If the ending flag is "off", the third hierarchical level divided bit string retrieval block 312-3 performs the above-described third hierarchical level retrieval processes in the steps S441 to S448 shown in FIG. 18, wherein the parameter "n" is set "3" through the initialization made in the step S421 shown in FIG. 17. After the third hierarchical level retrieval processes have been completed by the third hierarchical level divided bit string retrieval block 312-3, then the third hierarchical level divided bit string retrieval block 312-3 supplies the transfer destination distribution information acquisition block 314A with the third hierarchical level retrieval result information 313-3, which includes the ending flag, the address "NXTLPTR", the pointer REG_VBIT, the pointer REG_NN-PTR, the parameter REG_STAGE and the bit string of the IP address. If the ending flag is "on", the third hierarchical level divided bit string retrieval block 312-3 does not perform the third hierarchical level retrieval processes and does supply the transfer destination distribution information acquisition block 314A with the received second hierarchical level retrieval result information 313-2 as the third hierarchical level retrieval result information 313-3.

Upon receipt of the third hierarchical level retrieval result information 313-3 from the third hierarchical level divided bit string retrieval block 312-3, the transfer destination distribution information acquisition block 314A performs the acquisition processes shown in FIG. 19 for acquiring the transfer destination distribution information 317 from the transfer destination distribution information table 315A.

Third Embodiment

Figure 25:
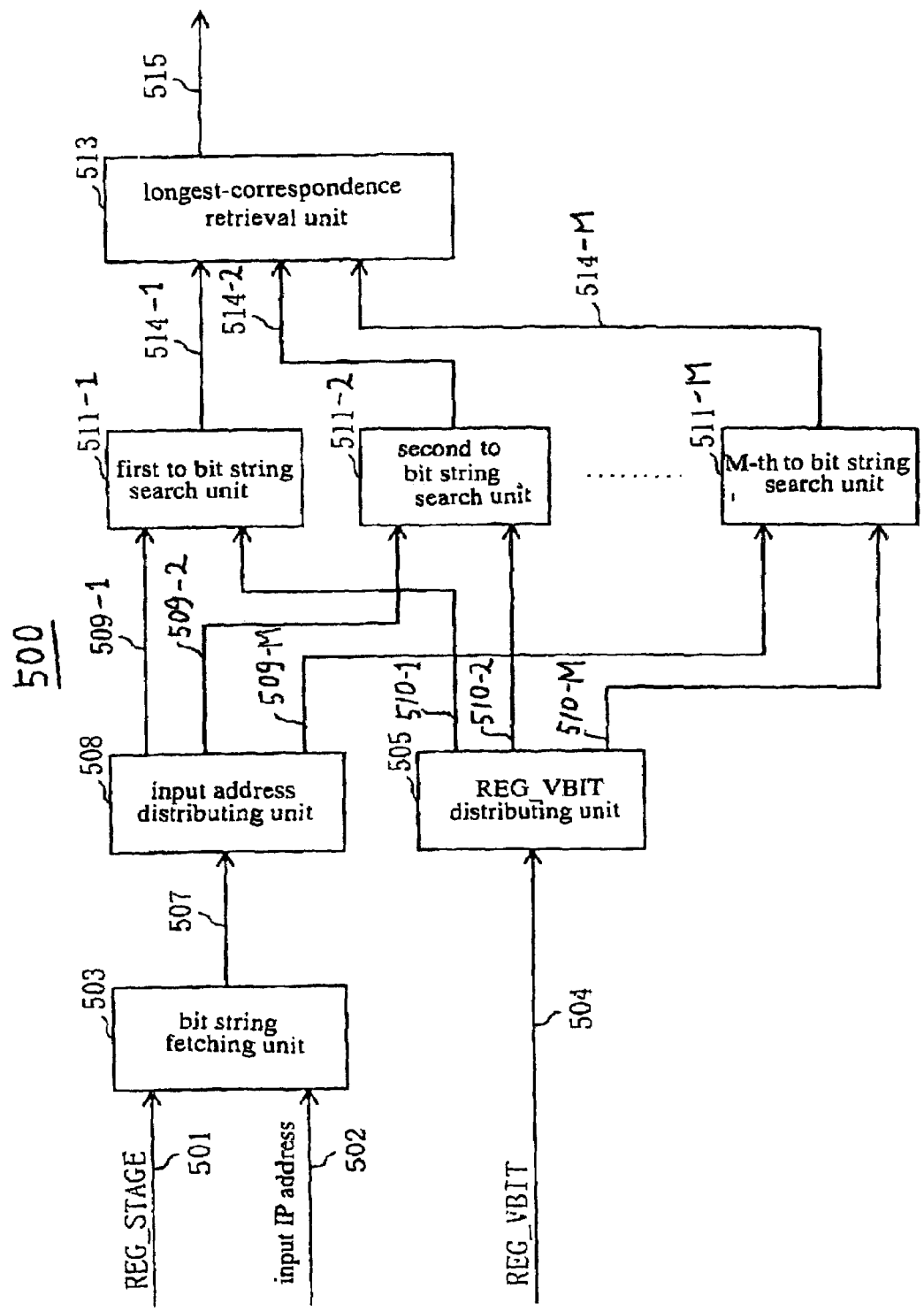
FIG. 25 is a block diagram illustrative of a configuration of an off-set pointer calculation unit included in the transfer destination distribution information acquisition block included in the novel address retrieval apparatus shown in FIG. 10, in a third embodiment in accordance with the present invention.

A third embodiment according to the present invention will be described in detail with reference to the drawings. FIG. 25 is a block diagram illustrative of a configuration of an off-set pointer calculation unit included in the transfer destination distribution information acquisition block 314 included in the novel address retrieval apparatus 310 shown in FIG. 10, in a third embodiment in accordance with the present invention.

The transfer destination distribution information acquisition block 314 included in the novel address retrieval apparatus 310 shown in FIG. 10 is configured to calculate an off-set pointer in order to acquire a transfer destination distribution information 317 from the parameter REG_STAGE, the input IP address and the pointer REG_VBIT.

The off-set pointer indicates or designates a position or an address of a bit string in a transfer destination distribution information table node. For example, a bit string "101" on the transfer destination distribution information table node 371 shown in FIG. 22 is a twelfth bit string from a head bit string "0". In this case, the off-set pointer is "12".

The transfer destination distribution information acquisition block 314 included in the novel address retrieval apparatus 310 shown in FIG. 10 includes an off-set pointer calculation unit 500 shown in FIG. 25. The off-set pointer calculation unit 500 includes a bit string fetching unit 503, a REG_VBIT distributing unit 505, an input address distributing unit 508, first to M-th bit string search units 511-1 to 511-M, and a longest-correspondence retrieval unit 513.

The bit string fetching unit 503 receives an input of a parameter REG_STAGE 501 and another input of an input IP address 502. The bit string fetching unit 503 fetches a corresponding bit string from the input IP address 502, wherein the corresponding bit string corresponds to a hierarchical level represented by the parameter REG_STAGE 501. The bit string fetching unit 503 sends the fetched bit string as a parameter 507 to the input address distributing unit 508 positioned at the follower stage to the bit string fetching unit 503.

The input address distributing unit 508 distributes an input IP address 509 to the first to Mth bit string search units 511-1 to 511-M which are positioned on the follower stage to the input address distributing unit 508 and also to the REG_VBIT distributing unit 505.

The REG_VBIT distributing unit 505 receives an input of a REG_VBIT 504, and divides the received REG_VBIT 504 into first to Mth divided bit strings 510-1, 510-2, . . . 510-M with first to Mth bit lengths different from each other. The REG_VBIT distributing unit 505 distributes the first to Mth divided bit strings 510-1, 510-2, . . . 510-M with first to Mth bit lengths to the first to Mth bit string search units 511-1 to 511-M, respectively.

The longest-correspondence retrieval unit 513 is positioned on the follower stage to the first to Mth bit string search units 511-1 to 511-M, so that the longest-correspondence retrieval unit 513 receives first to Mth off-set pointers 514-1, 514-2, . . . 514-M from the first to Mth bit string search units 511-1 to 511-M, respectively. The longest-correspondence retrieval unit 513 generates an off-set pointer 515 to the transfer destination distribution information based on the received first to Mth off-set pointers 514-1, 514-2, . . . 514-M.

The bit string fetching unit 503 fetches the corresponding bit string from the input IP address 502, wherein the corresponding bit string corresponds to a hierarchical level represented by the parameter REG_STAGE 501 before the bit string fetching unit 503 sends the fetched bit string as a parameter 507 to the input address distributing unit 508. It will, hereby, be assumed that the bit length of the IP address is "9", the divisional number is "3" and the divided bit string length is "3".

If the parameter REG_STAGE 501 is "1" which indicates the first hierarchical level, then the bit string fetching unit 503 fetches the first hierarchical level bit string of bits "1", "2" and "3" from the input IP address 502, and supplies the fetched first hierarchical level bit string of bits "1", "2" and "3" as the parameter 507 to the input address distributing unit 508.

If the parameter REG_STAGE 501 is "2" which indicates the second hierarchical level, then the bit string fetching unit 503 fetches the second hierarchical level bit string of bits "4", "5" and "6" from the input IP address 502, and supplies the fetched second hierarchical level bit string of bits "4", "5" and "6" as the parameter 507 to the input address distributing unit 508.

If the parameter REG_STAGE 501 is "3" which indicates the third hierarchical level, then the bit string fetching unit 503 fetches the third hierarchical level bit string of bits "7", "8" and "9" from the input IP address 502, and supplies the fetched third hierarchical level bit string of bits "7", "8" and "9" as the parameter 507 to the input address distributing unit 508.

The input address distributing unit 508 receives the corresponding hierarchical level bit strings as the parameter 507 from the bit string fetching unit 503, and distributes the received corresponding hierarchical level bit string as the input IP address 509 to the first to Mth bit string search units 511-1 to 511-M. For example, the input address distributing unit 508 transfers a most significant bit of the received corresponding hierarchical level bit string to the first bit string search unit 511-1. The input address distributing unit 508 transfers the most significant bit and a second most significant bit of the received corresponding hierarchical level bit string to the second bit string search unit 511-2. The input address distributing unit 508 transfers all bits of the received corresponding hierarchical level bit string to the Mth bit string search unit 51'-M.

The REG_VBIT distributing unit 505 divides the received REG_VBIT 504 into first to Mth divided bit strings 510-1, 510-2, . . . 510-M with first to Mth bit lengths different from each other. The REG_VBIT distributing unit 505 distributes the first to Mth divided bit strings 510-1, 510-2, . . . 510-M with first to Mth bit lengths to the first to Mth bit string search units 511-1 to 511-M, respectively The REG_VBIT distributing unit 505 distributes first and second bits at 2-bit length of the pointer REG_VBIT 504 to the first bit string search unit 511-1. The REG_VBIT distributing unit 505 also distributes third and sixth bits at 4-bit length of the pointer REG_VBIT 504 to the second bit string search unit 511-2. The REG_VBIT distributing unit 505 also distributes bits of 2 to the Mth-power from the right at the 2 to the Mth-power bit length of the pointer REG_VBIT 504 to the Mth bit string search unit 511-M. In case of M=3, the pointer REG_VBIT 504 is as shown in FIG. 13. The first and second bits from the left have a 2-bit length. The third to sixth bits from the left have a 3-bit length. The seventh to fourteenth bits from the left have a 3-bit length. The first and second bits from the left with the 2-bit length are supplied to the first bit string search unit 511-1. The third to sixth bits from the left with the 3-bit length are supplied to the second bit string search unit 511-2. The seventh to fourteenth bits from the left with the 3-bit length are supplied to the third bit string search unit 511-3.

The first to Mth bit string search units 511-1 to 511-M respectively receive the first to Mth divided bit strings 510-1, 510-2, . . . 510-M with first to Mth bit lengths from the REG_VBIT distributing unit 505, respectively. Further, the first to Mth bit string search units 511-1 to 511-M respectively receive corresponding bit parts 509-1, 509-2, . . . 509-M of the corresponding hierarchical level bit string from the input address distributing unit 508. The first to Mth bit string search units 511-1 to 511-M respectively compare the corresponding bit parts 509-1, 509-2, . . . 509-M of the corresponding hierarchical level bit string to the first to Mth divided bit strings 510-1, 510-2, . . . 510-M with first to Mth bit lengths, in order to verify respective correspondences between the corresponding bit parts 509-1, 509-2, . . . 509-M of the corresponding hierarchical level bit string and the first to Mth divided bit strings 510-1, 510-2, . . . 510-M with first to Mth bit lengths. Namely, each of the first to Mth bit string search units 511-1 to 511-M verifies any correspondence between the corresponding bit part of the input IP address 502 and the divided bit string with the corresponding bit length from the pointer REG_VBIT 504. If each of the first to Mth bit string search units 511-1 to 511-M verifies the correspondence between them in view of the corresponding bit length, each of the first to Mth bit string search units 511-1 to 511-M sends corresponding one of the off-set pointers 514-1, 514-2, . . . 514-M in view of the corresponding bit length.

If the value M is 3, then the first to third bit string search units 511-1 to 511-3 are provided. In this case, the first to third bit string search units 511-1 to 511-3 respectively receive the first to third divided bit strings 510-1, 510-2 and 510-3 with first to third bit lengths from the REG_VBIT distributing unit 505, respectively. Further, the first to third bit string search units 511-1 to 511-3 respectively receive corresponding bit parts 509-1, 509-2 and 509-3 of the corresponding hierarchical level bit string from the input address distributing unit 508. The first to third bit string search units 511-1 to 511-3 respectively compare the corresponding bit parts 509-1, 509-2 and 509-3 of the corresponding hierarchical level bit string to the first to third divided bit strings 510-1, 510-2 and 510-3 with first to third bit lengths, in order to verify respective correspondences between the corresponding bit parts 509-1, 509-2 and 509-3 of the corresponding hierarchical level bit string and the first to third divided bit strings 510-1, 510-2 and 510-3 with first to third bit lengths. Namely, each of the first to third bit string search units 511-1 to 511-3 verifies any correspondence between the corresponding bit part of the input IP address 502 and the divided bit string with the corresponding bit length from the pointer REG_VBIT 504. If each of the first to third bit string search units 511-1 to 511-3 verifies the correspondence between them in view of the corresponding bit length, each of the first to third bit string search units 511-1 to 511-3 sends corresponding one of the off-set pointers 514-1, 514-2, . . . 514-3 in view of the corresponding bit length.

For example, the first bit string search unit 511-1 compares a divided bit string with a bit length "1" as a part of the full bit string of the input IP address 502 to first two bits of the pointer REG_VBIT 504, which indicate whether or not the string with the bit length "1" is registered. If the first bit string search unit 511-1 verifies the correspondence between them, then the first bit string search unit 511-1 sends the off-set pointer 514-1 of a bit string "0" or "1" of the transfer destination distribution information table node to the longest-correspondence retrieval unit 513.

The longest-correspondence retrieval unit 513 receives first to Mth off set pointers 514-1, 514-2, . . . 514-M from the first to Mth bit string search units 511-1 to 511-M, and selects bit-length-longest one 514-X of the first to Mth off set pointers 514-1, 514-2, . . . 514-M, wherein the selected bit-length-longest off set pointer 514-X serves as a pointer to the transfer destination distribution information 317 as shown in FIG. 10. For example, if the longest-correspondence retrieval unit 513 receives the second and third off set pointers 514-2 and 514-3 from the second and third bit string search units 511-1 and 511-3, then the longest-correspondence retrieval unit 513 selects the third off set pointer 514-3 which is longer in bit length than the second off set pointer 514-2.

The address retrieval apparatus shown in FIG. 25 is configured to perform parallel processings of the bit divided bit strings for every different bit lengths of the divided bit strings for improving throughputs of the address retrieval works. This address retrieval apparatus may be realized by a variety of hardwires such as circuits and apparatus.

The above-described examples for the non-divided bit length, the divided bit length and the number of the division may be optional. Variations or changes to the non-divided bit length, the divided bit length and the number of the division may be allowable. The above-described example has been provided based on the uniform divided bit string configuration, even the divided bit string configuration may be variable and non-uniform.

The above-described examples have also been provided based on the IP address. Needless to say, the present invention is applicable to not only retrieval of the IP address but also other retrievals to any addresses necessary for routing in a plurality of commination routes.

Although the invention has been described above in connection with several preferred embodiments therefor, it will be appreciated that those embodiments have been provided solely for illustrating the invention, and not in a limiting sense. Numerous modifications and substitutions of equivalent materials and techniques will be readily apparent to those skilled in the art after reading the present application, and all such modifications and substitutions are expressly understood to fall within the true scope and spirit of the appended claims.

What is claimed is:

1. An address retrieval apparatus including:
   a divided bit string generating unit for dividing an original bit string into a plurality of divided bit strings, each of which has one of plural different hierarchical levels, said original bit string providing a route information which defines a route to a final destination for data transmission through a communication network;
   a transfer destination distribution information storage unit for storing a transfer destination distribution information which indicates a distributed transfer destination for data transmission in accordance with said route information;
   a retrieval table including a hierarchical tree structure which comprises said divided bit strings and plural retrieval table nodes, wherein each of said plural retrieval table nodes further includes at least one of a next retrieval table node designation information indicating a next retrieval table node based on corresponding one of said divided bit strings and a transfer destination distribution information storage location designation information designating a location at which said transfer destination distribution information is stored in said transfer destination distribution information storage unit;

a hierarchy definition unit for shifting up by one level a hierarchy level of said retrieval table node to execute a retrieval process with reference to said retrieval table node until said hierarchy definition unit retrieves said transfer destination distribution information storage location designation information from said retrieval table node, and said hierarchy definition unit defining one hierarchy level upon retrieval of said transfer destination distribution information storage location designation information; and a transfer destination distribution information acquiring unit for acquiring said transfer destination distribution information from said retrieval table node based on said transfer destination distribution information storage location designation information retrieved by said hierarchy definition unit from said retrieval table node with said defined hierarchy level.

2. The address retrieval apparatus as claimed in claim 1, wherein said divided bit string generating unit divides said original bit string from a head to a tail of said original bit string in accordance with a predetermined bit length rule for each of said plural different hierarchical levels, and fetches said divided bit strings in a sequence from said head to said tail, so that said divided bit strings in said sequence from said head to said tail respectively correspond to said plural different hierarchical levels in a sequence of a bottom level to a top level.

3. The address retrieval apparatus as claimed in claim 2, wherein said hierarchy definition unit executes said retrieval process in said sequence of said bottom level to said top level of said plural different hierarchical levels by use of said divided bit strings in said sequence from said head to said tail.

4. The address retrieval apparatus as claimed in claim 1, wherein said hierarchy definition unit shifts up by one level said hierarchy level, during said next retrieval table node designation information is read out of a retrieval table node with a first hierarchical level.

5. The address retrieval apparatus as claimed in claim 1, wherein only said retrieval table node necessary for storing said next retrieval table node designation information includes a storage area for storing said next retrieval table node designation information, and said retrieval table node unnecessary for storing said next retrieval table node designation information is free of said storage area.

6. The address retrieval apparatus as claimed in claim 1, wherein each of said retrieval table nodes at all of said hierarchical levels includes an additional information which indicates a presence or an absence of said retrieval table node having a next hierarchical level which is higher by one level than its hierarchical level of said each retrieval table node.

7. The address retrieval apparatus as claimed in claim 1, wherein said transfer destination distribution information storage location designation information includes an area storing said transfer destination distribution information in said transfer destination distribution information storage unit, and an address which designates a storage location of said transfer destination distribution information in said area.

8. The address retrieval apparatus as claimed in claim 7, wherein the number of addresses possessed by said area is equal to the square of a bit number of corresponding one of said divided bit strings.

9. The address retrieval apparatus as claimed in claim 1, wherein said divided bit strings have a uniform bit number.

10. The address retrieval apparatus as claimed in claim 1, wherein said divided bit string generating unit further comprises a plurality of divided bit string generating sub-units which correspond to said plural different hierarchical levels, said hierarchy definition unit further comprises a plurality of hierarchy definition sub-units which correspond to said plural different hierarchical levels, said retrieval table further comprises a plurality of retrieval sub-tables which correspond to said plural different hierarchical levels, and said divided bit string generating sub-units, said hierarchy definition sub-units and said retrieval sub-tables make plural sets which correspond to said plural different hierarchical levels, so that said plural sets perform parallel processings for said plural different hierarchical levels.

11. The address retrieval apparatus as claimed in claim 1, wherein said transfer destination distribution information acquiring unit includes an off-set pointer calculation unit for calculating an off-set point, which designates a storage location of a bit string in one of nodes of said transfer destination distribution information storage unit, based on a retrieval result supplied from said hierarchy definition unit.

* * * * *